US008632701B2

(12) United States Patent  
Yamaguchi et al.

(10) Patent No.: US 8,632,701 B2  
(45) Date of Patent: Jan. 21, 2014

(54) PROTON CONDUCTIVE HYBRID MATERIAL, AND CATALYST LAYER FOR FUEL CELL USING THE SAME

(75) Inventors: Takeo Yamaguchi, Bunkyo-ku (JP); Ju Myeung Lee, Bunkyo-ku (JP); Gopinathan Madhavikutty Anilkumar, Bunkyo-ku (JP)

(73) Assignee: The University of Tokyo, Tokyo (JP)

( * ) Notice: Subject to any disclaimer, the term of this patent is extended or adjusted under 35 U.S.C. 154(b) by 1145 days.

(21) Appl. No.: 12/064,224

(22) PCT Filed: Oct. 3, 2005

(86) PCT No.: PCT/JP2005/018271  
§ 371 (c)(1),  
(2), (4) Date: Feb. 19, 2008

(87) PCT Pub. No.: WO2007/029346  
PCT Pub. Date: Mar. 15, 2007

(65) Prior Publication Data  
US 2009/0220840 A1 Sep. 3, 2009

Related U.S. Application Data

(60) Provisional application No. 60/709,476, filed on Aug. 19, 2005.

(51) Int. Cl.  
*H01L 31/0264* (2006.01)  
*H01M 4/86* (2006.01)  
*H01M 4/96* (2006.01)  
*H01M 8/02* (2006.01)

(52) U.S. Cl.  
USPC ............. 252/520.2; 252/500; 252/520.22; 429/496; 136/252; 521/54; 521/55

(58) Field of Classification Search  
USPC ............. 252/500, 520.2, 520.22; 429/496; 136/252; 521/54, 55  
See application file for complete search history.

(56) References Cited

U.S. PATENT DOCUMENTS

| 5,919,583 | A | 7/1999 | Grot |
| 2003/0170521 | A1 | 9/2003 | Zhang |

(Continued)

FOREIGN PATENT DOCUMENTS

| CN | 1385464 A | 12/2002 |
| CN | 1710743 A | 12/2005 |

(Continued)

OTHER PUBLICATIONS

Li, Q., et al., "Approaches and Recent Development of Polymer Electrolyte Membranes for Fuel Cells Operating Above 100° C.," Chemistry of Materials 15:4896-4915, 2003.

(Continued)

*Primary Examiner* — Brian P Mruk  
(74) *Attorney, Agent, or Firm* — Christensen O'Connor Johnson Kindness PLLC

(57) ABSTRACT

This invention provides an organic-inorganic hybrid material, which can exhibit high proton conductivity in a wide temperature range of a low temperature to a high temperature, a proton conductive material, which has a small particle diameter, that is, has a particle diameter capable of reaching pores of primary particles of carbon powder or the like, and has controlled particle diameters, a catalyst layer containing these materials for a fuel cell and an electrolyte film containing these materials for a fuel cell, and a fuel cell. The proton conductive hybrid material comprises proton conductive inorganic nanoparticles and a proton conductive polymer, wherein the Stokes particle diameter of the proton conductive hybrid material by dynamic light scattering is not more than 20 nm.

46 Claims, 12 Drawing Sheets

(56) References Cited

U.S. PATENT DOCUMENTS

| | | |
|---|---|---|
| 2004/0048129 A1 | 3/2004 | Taft, III |
| 2004/0053060 A1* | 3/2004 | Roziere et al. ............... 428/447 |
| 2005/0282052 A1 | 12/2005 | Kim |
| 2006/0182942 A1 | 8/2006 | Valle |
| 2006/0194096 A1 | 8/2006 | Valle |

FOREIGN PATENT DOCUMENTS

| | | |
|---|---|---|
| JP | 2004-311301 A | 11/2004 |
| JP | 2004-311315 A | 11/2004 |
| JP | 2005-197209 A | 7/2005 |
| JP | 2006-016297 A | 1/2006 |
| JP | 2006-024558 A | 1/2006 |
| WO | 00/66652 A1 | 11/2000 |
| WO | 02/05370 A1 | 1/2002 |
| WO | 02/92638 A1 | 11/2002 |
| WO | 03/081691 A2 | 10/2003 |
| WO | 03/083985 A2 | 10/2003 |
| WO | 2004/067611 A1 | 8/2004 |
| WO | 2004/067640 A2 | 8/2004 |

OTHER PUBLICATIONS

LaConti, A.B., et al., "Proton Exchange Membrane Electrochemical Capacitors and Fuel Cells for Pulse Power Applications," Proceedings of the 35th IEEE International Power Sources Symposium, Cherry Hill, N.J., Jun. 22-25, 1992, pp. 298-301.

* cited by examiner

PROTON CONDUCTIVE HYBRID MATERIAL, AND CATALYST LAYER FOR FUEL CELL USING THE SAME

CROSS-REFERENCE TO RELATED APPLICATION

This application claims the benefit to U.S. Provisional Application No. 60/709,476, filed Aug. 19, 2005.

BACKGROUND OF THE INVENTION

1. Field of the Invention

The present invention relates to a proton conductive hybrid material which comprises a proton-conductive inorganic nanoparticle and a proton-conductive polymer, and which has small-regulated particle diameter. In particular, the present invention relates to a catalyst layer for use of a fuel cell, wherein the proton conductive hybrid material, which has small-regulated particle diameter, is included in primary pores of the catalyst layer, and to a method for producing the material and the catalyst layer.

2. Description of Related Art

In recent years, much attention has been paid on the development and use of novel organic-inorganic nanocomposite materials as proton conductors, especially because of its possible commercial application in polymer electrolyte membrane fuel cells (PEMFC), since these materials can show high conductivity and can form thermally stable membranes at elevated temperatures.

Considering the properties of proton conductive materials, in general, polymeric materials show a desirable conductivity under humidified condition; however, the disadvantages are its degradation at higher temperatures and its high resistance when it is not humidified properly. On the other hand, inorganic conductors are thermally and mechanically more stable, but they are brittle and the pure oxides do not show high proton conductivity. However, its ability to retain water even at high temperatures makes it attractive as far as the proton conductivity is concerned. Hence, Proper methods should be made to enhance the proton conductivity of these materials.

There is a general agreement in the scientific community that there is a need for a novel proton conducting material which can show appreciable conductivity at elevated temperatures along with other properties. Synthesis of proton conducting inorganic-polymer hybrid material seems to be an option in order to overcome the difficulties of Nafion®, and therefore can be used in PEMFC operating at higher temperature. In hybrids, the thermal stability is provided by the inorganic back bone, while the polymer part confers the required specific properties such as flexibility and processability.

PEFC for automobiles requires continuous operation from –25° C. at initial motion to 120° C. during operation. Fluorine-based ionomers, a major example of which is Nafion®, show favorable proton conductivity at low temperatures, but cannot be used at high temperatures because of the sudden decrease in proton conductivity and poor heat resistance. In addition, fluorine-based ionomers require high production cost, and place a heavy load to the environment because of the fluorine component. An alternative material, SPES, which is a hydrocarbon-based ionomer, is inexpensive and provides a high structure controllability, oxidation resistance, and heat resistance, but it requires water activity to show high proton conductivity (see Non Patent Document 1). Therefore, the hydrocarbon-based ionomer cannot maintain proton conductivity at high temperatures and under normal pressure. Development of proton conductivity in a wide temperature range requires structuring a hybrid structure material. Many studies have been made on modification of hybrid materials with inorganic materials which can maintain proton conductivity at high temperatures (heteropoly acid, hydrogen sulfate, and inorganic solid proton conductors) (see Non Patent Document 2). Hydrated zirconia and a tetravalent metal described herein can maintain proton conductivity at high temperatures. In addition, hydrated zirconia is a precursor of ZrS and ZrP which show high proton conductivity. These studies are mainly focused on ionomers as electrolyte membranes, and few studies discuss about ionomers as electrodes. In an electrode, a catalyst layer composed of carbon as the electron transfer pathway, an ionomer as the gas or proton transfer pathway, and a platinum catalyst as the electric power generation site has, as shown in FIG. 1, a complicated structure including primary pores (20 nm to 40 nm) and secondary pores (40 nm) of agglomerate size. The primary pores have a small diameter and thus inhibit the entrance of a polymeric ionomer, which hinders the formation of proton pathways extending to the inside catalyst. Therefore, the total utilization of the catalyst is on the order of only 20%. Therefore, the size of the ionomer in the electrode is important. In spite of the background of the electrode structure, the structure analysis of electrodes composed of ionomers, or the performance evaluation of fuel cells including such electrodes have not been conducted.

Non Patent Document 1: Cotter, C. J. Engineering Plastics: A Handbook of Polyaryleters; Gordon & Breach: London, 1965.

Non Patent Document 2: Li, Q. He, R. Jensen, J. O. Bjerrum, N. J. Chemistry of Material 15 (2003), 4896-4915.

DISCLOSURE OF THE INVENTION

Problem to be Solved by the Invention

A polymer electrolyte fuel cell (PEFC) using a high-activity catalyst is readily initiated at ordinary temperatures, generates higher power in spite of its small body, shows a higher conversion efficiency, and generates no toxic gas such as NOx or SOx. Therefore, PEFC has been receiving attention as a next-generation energy source. However, PEFC has various problems in its practical application, and the PEFC system must be optimized considering its properties according to applications. PEFC can be used as an energy source for transfer applications, stationary applications, and mobile applications. In particular, transfer applications as in automobiles require the development of a novel electrolyte ionomer which can maintain high proton conductivity in a wide temperature range from –25 to 120° C. and at low humidities.

When an electrolyte ionomer is included in a membrane and an electrode to play an important role in generation of electrical energy, it is difficult to deliver such properties with a single material. Therefore, it is necessary to structure a hybrid material in which materials having novel properties, which cannot be provided by a single material, are directly connected.

Accordingly, an object of the present invention is to solve the above-described problems.

An object of the present invention is to provide an organic-inorganic hybrid material which can show higher proton conductivity in a wide temperature range from low temperatures to high temperatures.

Another object of the present invention is, in addition to the above-described object, to provide an organic-inorganic hybrid material which can show higher proton conductivity in a wide temperature range and at low humidities.

Another object of the present invention is, other than or in addition to the above-described objects, to provide a proton-conductive material whose particle diameter has been controlled so that the material can reach small pores, for example, the pores of primary particles of carbon powder.

Another object of the present invention is to provide a catalyst layer for fuel cell and an electrolyte membrane for fuel cell including the above-described material, and a fuel cell including the catalyst layer and electrolyte membrane.

Another object of the present invention is to provide methods for producing the above-described material, catalyst layer, electrolyte membrane, and fuel cell.

More specifically, in the present invention, the inventors intend to develop an electrode which allows operation of PEFC in a wide temperature range, the electrode including a hybrid ionomer containing an organic material or SPES (sulfonated polyarylene ether sulfone), incorporating an inorganic material, or $Zr(OH)_2$ (hydrated zirconia). The hybrid electrode having an ionomer structure is subjected to structure analysis and fuel cell performance test.

Means for Solving Problem

The present inventors have found that the following inventions can solve the above-described problems:

<1> A proton-conductive hybrid material comprising a proton-conductive inorganic nanoparticle and a proton-conductive polymer, wherein a Stokes particle diameter of said proton-conductive hybrid material determined by Dynamic Light Scattering method is 20 nm or less, preferably 10 nm or less, more preferably 5 nm or less. Preferably, said proton-conductive polymer may be located in the vicinity of said proton-conductive inorganic nanoparticle, and more preferably, said proton-conductive inorganic nanoparticle may be surrounded by said proton-conductive polymer.

<2> In the above item <1>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<3> In the above item <2>, said zirconium compound may be at least one selected from the group consisting of $ZrO_2$, $ZrO_2 \cdot nH_2O$, $Zr(HPO_4)_2$, $Zr(HPO_4)_2 \cdot nH_2O$, $Zr(HSO_3)_2$, $Zr(HSO_3)_2 \cdot nH_2O$, $Zr(O_3P-R^1-SO_3H)_2$, $Zr(O_3P-R^1-SO_3H)_2 \cdot nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x \cdot nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<4> In the above item <2>, said titanium compound may be at least one selected from the group consisting of $TiO_2$, $TiO_2 \cdot nH_2O$, $Ti(HPO_4)_2$, $Ti(HPO_4)_2 \cdot nH_2O$, $Ti(HSO_3)_2$ and $Ti(HSO_3)_2 \cdot nH_2O$. In the above item <2>, said cerium compound may be at least one selected from the group consisting of $CeO_2$, $CeO_2 \cdot nH_2O$, $Ce(HPO_4)_2$ and $Ce(HPO_4)_2 \cdot nH_2O$. In the above item <2>, said uranium compound may be at least one selected from the group consisting of $H_3OUO_4PO_4$, $H_3OUO_4PO_4 \cdot nH_2O$, $H_3OUO_2AsO_4$ and $H_3OUO_2AsO_4 \cdot nH_2O$. In the above item <2>, said tin compound may be $SnO_2$ or $SnO_2 \cdot nH_2O$. In the above item <2>, said vanadium compound may be $V_2O_5$ or $V_2O_5 \cdot nH_2O$. In the above item <2>, said antimony compound may be at least one selected from the group consisting of $Sb_2O_5$, $Sb_2O_5 \cdot nH_2O$, $HSbO_3$, $HSbO_3 \cdot nH_2O$, $H_2SbO_{11}$, $H_2SbO_{11} \cdot nH_2O$, $H_xSb_xP_2O_3$ and $H_xSb_xP_2O_3 \cdot nH_2O$, wherein x represents 1, 3 or 5 and n is 2-10. In the above item <2>, said calcium hydroxyapatite and hydrated calcium hydroxyapatites may be at least one selected from the group consisting of $Ca_{10}(PO_4)X_2$ and $Ca_{10}(PO_4)X_2 \cdot nH_2O$, wherein X represents —OH and/or —F.

<5> In any one of the above items <1> to <4>, said proton-conductive inorganic nanoparticle may have a Stokes particle diameter, determined by Dynamic Light Scattering method, of 20 nm or less, preferably 10 nm or less, more preferably 5 nm or less.

<6> In any one of the above items <1> to <5>, said proton-conductive inorganic nanoparticle may have a proton conductivity of the order of $1 \times 10^{-5}$ S/cm, preferably of the order of $1 \times 10^{-3}$ S/cm, more preferably of the order of $1 \times 10^{-2}$ S/cm at temperature of 20-150° C.

<7> In any one of the above items <1> to <6>, said proton-conductive polymer may be one or more of hydrocarbon-based polymers, preferably heat-resistant hydrocarbon-based polymers, which can be dissolved in polar organic solvent.

<8> In the above item <7>, said polar organic solvent may be selected from the group consisting of N,N-dimethylformamide, dimethyl sulfoxide, 1-methylpyrrolidone and N-methyl acetamide, preferably the group consisting of N,N-dimethylformamide, dimethyl sulfoxide and 1-methylpyrrolidone.

<9> In any one of the above items <1> to <8>, said proton-conductive polymer may be one or more of sulfonated hydrocarbon-based polymers.

<10> In any one of the above items <1> to <9>, said proton-conductive polymer may be chemically bound to said proton-conductive inorganic nanoparticle.

<11> In any one of the above items <1> to <10>, said proton-conductive hybrid material may have a proton conductivity of $10^{-3}$ S/cm to 1 S/cm at temperature of −20 to 150° C. under low and high humidity conditions.

<12> A dispersion comprising a proton-conductive hybrid material and polar organic solvent, wherein said proton-conductive hybrid material is evenly dispersed in said polar organic solvent selected from the group consisting of N,N-dimethylformamide, dimethyl sulfoxide, 1-methylpyrrolidone and N-methyl acetamide, said proton-conductive hybrid material comprises a proton-conductive inorganic nanoparticle and a proton-conductive polymer, and a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<13> In the above item <12>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<14> In the above item <13>, said zirconium compound may be at least one selected from the group consisting of $ZrO_2$, $ZrO_2 \cdot nH_2O$, $Zr(HPO_4)_2$, $Zr(HPO_4)_2 \cdot nH_2O$, $Zr(HSO_3)_2$, $Zr(HSO_3)_2 \cdot nH_2O$, $Zr(O_3P-R^1-SO_3H)_2$, $Zr(O_3P-R^1-SO_3H)_2 \cdot nH_2O$, $Zr(O_3P-R^2-SO_3H)_{2-x}$ $(O_3P—R^1—COOH)_x$, and $Zr(O_3P—R^2—SO_3H)_{2-x}(O_3P—R^3—COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<15> In the above item <13>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <13>, said cerium compound may be at least one selected from the group consisting of $CeO_2$, $CeO_2.nH_2O$, $Ce(HPO_4)_2$ and $Ce(HPO_4)_2.nH_2O$. In the above item <13>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <13>, said tin compound may be $SnO_2$ or $SnO_2.nH_2O$. In the above item <13>, said vanadium compound may be $V_2O_5$ or $V_2O_5.nH_2O$. In the above item <13>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <13>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<16> In any one of the above items <12> to <15>, said proton-conductive inorganic nanoparticle may have a Stokes particle diameter, determined by Dynamic Light Scattering method, of 20 nm or less, preferably 10 nm or less, more preferably 5 nm or less.

<17> In any one of the above items <12> to <16>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<18> In any one of the above items <12> to <17>, said proton-conductive polymer may be one or more of hydrocarbon-based polymers, preferably heat-resistant hydrocarbon-based polymers, which can be dissolved in said polar organic solvent.

<19> In any one of the above items <12> to <18>, said polar organic solvent may be selected from the group consisting of N,N-dimethylformamide, dimethyl sulfoxide and 1-methylpyrrolidone.

<20> In any one of the above items <12> to <19>, said proton-conductive polymer may be one or more of sulfonated hydrocarbon-based polymers.

<21> In any one of the above items <12> to <20>, said proton-conductive polymer may be chemically bound to said proton-conductive inorganic nanoparticle.

<22> A method of preparing a dispersion which comprises a proton-conductive hybrid material and polar organic solvent, comprising the steps of:

dissolving a proton-conductive polymer in a first polar organic solvent selected from the group of consisting of N,N-dimethylformamide, dimethyl sulfoxide, 1-methylpyrrolidone and N-methyl acetamide, to obtain a polymer solution;

dispersing a proton-conductive nanoparticle in a second polar organic solvent, which is the same as or different from said first polar organic solvent, selected from the group of consisting of N,N-dimethylformamide, dimethyl sulfoxide, 1-methylpyrrolidone and N-methyl acetamide, to obtain a nanoparticle dispersion; and pouring said polymer solution into said nanoparticle dispersion or vice versa, to obtain said dispersion which comprises said polar organic solvent and said a proton-conductive hybrid material, wherein said material comprises said proton-conductive nanoparticle and said proton-conductive polymer, and a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<23> In the above item <22>, the method may further comprise a step of adding a poor organic solvent for said proton-conductive polymer into the resultant dispersion, to obtain dispersion having said proton-conductive hybrid material with smaller Stokes particle diameter.

<24> In the above item <23>, said poor organic solvent may be selected from the group consisting of methanol, ethanol, isopropanol, butanol and hexane, preferably isopropanol.

<25> In any one of the above items <22> to <24>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<26> In the above item <25>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P—R^1—SO_3H)_2$, $Zr(O_3P—R^1—SO_3H)_2.nH_2O$, $Zr(O_3P—R^2—SO_3H)_{2-x}(O_3P—R^3—COOH)_x$, and $Zr(O_3P—R^2—SO_3H)_{2-x}(O_3P—R^3—COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<27> In the above item <25>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <25>, said cerium compound may be at least one selected from the group consisting of $CeO_2$, $CeO_2.nH_2O$, $Ce(HPO_4)_2$ and $Ce(HPO_4)_2.nH_2O$. In the above item <25>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <25>, said tin compound may be $SnO_2$ or $SnO_2.nH_2O$. In the above item <25>, said vanadium compound may be $V_2O_5$ or $V_2O_5.nH_2O$. In the above item <25>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <25>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<28> In any one of the above items <22> to <27>, said proton-conductive inorganic nanoparticle may have a Stokes particle diameter, determined by Dynamic Light Scattering method, of 20 nm or less, preferably 10 nm or less, more preferably 5 nm or less.

<29> In any one of the above items <22> to <28>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<30> In any one of the above items <22> to <29>, said proton-conductive polymer may be one or more of hydrocarbon-based polymers, preferably heat-resistant hydrocarbon-based polymers, which can be dissolved in polar organic solvent.

<31> In any one of the above items <22> to <30>, said first and/or second polar organic solvent may be selected from the group consisting of N,N-dimethylformamide, dimethyl sulfoxide, and 1-methylpyrrolidone.

<32> In any one of the above items <22> to <31>, said proton-conductive polymer may be one or more of sulfonated hydrocarbon-based polymers.

<33> In the step of pouring said polymer solution into said nanoparticle dispersion of any one of the above items <22> to <32>, said proton-conductive polymer may react with said proton-conductive inorganic nanoparticle, and one end of a part or all of said proton-conductive polymer may be chemically bound to said proton-conductive inorganic nanoparticle.

<34> A method of preparing a proton-conductive hybrid material which comprises a proton-conductive polymer and a proton-conductive inorganic nanoparticle, comprising the steps of:
dissolving a proton-conductive polymer in a first polar organic solvent selected from the group of consisting of N,N-dimethylformamide, dimethyl sulfoxide, 1-methylpyrrolidone and N-methyl acetamide, to obtain a polymer solution;
dispersing a proton-conductive nanoparticle in a second polar organic solvent, which is the same as or different from said first polar organic solvent, selected from the group of consisting of N,N-dimethylformamide, dimethyl sulfoxide, 1-methylpyrrolidone and N-methyl acetamide, to obtain a nanoparticle dispersion;
pouring said polymer solution into said nanoparticle dispersion or vice versa, to obtain said dispersion which comprises said polar organic solvent and said a proton-conductive hybrid material; and
removing said first and second polar organic solvent from the resulting dispersion, to obtain said proton-conductive hybrid material,
wherein said material comprises said proton-conductive nanoparticle and said proton-conductive polymer, and
a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<35> In the above item <34>, the method may further comprise a step of adding a poor organic solvent for said proton-conductive polymer into the resultant dispersion, to obtain dispersion having said proton-conductive hybrid material with smaller Stokes particle diameter.

<36> In the above item <35>, said poor organic solvent may be selected from the group consisting of methanol, ethanol, isopropanol, butanol and hexane, preferably isopropanol.

<37> In any one of the above items <33> to <36>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<38> In the above item <37>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P—R^1—SO_3H)_2$, $Zr(O_3P—R^1—SO_3H)_2.nH_2O$, $Zr(O_3P—R^2—SO_3H)_{2-x}(O_3P—R^3—COOH)_x$, and $Zr(O_3P—R^2—SO_3H)_{2-x}(O_3P—R^3—COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<39> In the above item <37>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <37>, said cerium compound may be at least one selected from the group consisting of $CeO_2$, $CeO_2.nH_2O$, $Ce(HPO_4)_2$ and $Ce(HPO_4)_2.nH_2O$. In the above item <37>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <37>, said tin compound may be $SnO_2$ or $SnO_2.nH_2O$. In the above item <37>, said vanadium compound may be $V_2O_5$ or $V_2O_5.nH_2O$. In the above item <37>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <37>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<40> In any one of the above items <34> to <39>, said proton-conductive inorganic nanoparticle may have a Stokes particle diameter, determined by Dynamic Light Scattering method, of 20 nm or less, preferably 10 nm or less, more preferably 5 nm or less.

<41> In any one of the above items <34> to <40>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<42> In any one of the above items <34> to <41>, said proton-conductive polymer may be one or more of hydrocarbon-based polymers, preferably heat-resistant hydrocarbon-based polymers, which can be dissolved in polar organic solvent.

<43> In any one of the above items <34> to <42>, said first and/or second polar organic solvent may be selected from the group consisting of N,N-dimethylformamide, dimethyl sulfoxide, 1-methylpyrrolidone and N-acetamide.

<44> In any one of the above items <34> to <43>, said proton-conductive polymer may be one or more of sulfonated hydrocarbon-based polymers.

<45> In the step of pouring said polymer solution into said nanoparticle dispersion of any one of the above items <34> to <44>, said proton-conductive polymer may react with said proton-conductive inorganic nanoparticle, and one end of a part or all of said proton-conductive polymer may be chemically bound to said proton-conductive inorganic nanoparticle.

<46> A catalyst layer used for a fuel cell, comprising an electron-conductor, a catalyst and a proton-conductive hybrid material,
wherein said proton-conductive hybrid material comprises a proton-conductive inorganic nanoparticle and proton-conductive polymer, and
a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<47> In the above item <46>, said catalyst layer used for a fuel cell may be constructed such that said catalyst may be carried at the surface of said electron-conductor, and that said proton-conductive hybrid material may be located near the position where said catalyst is located.

<48> In the above item <46> or <47>, said proton-conductive hybrid material may be physically and/or chemically bound to said electron-conductor.

<49> In any one of the above items <46> to <48>, said electron-conductor may be a carbon-based porous electron-conductor or metal-based porous electron-conductor, preferably carbon-based porous electron-conductor.

<50> In the above item <49>, the carbon-based porous electron-conductor may be selected from the group consisting of carbon black, acetylene black, graphite, carbon fiber, carbon nanotube, fullerene, activated carbon, and glass carbon.

<51> In any one of the above items <46> to <50>, said electron-conductor may have a particle diameter of 300 nm or less, preferably 100 nm or less, more preferably 30 nm or less.

<52> In any one of the above items <46> to <51>, said catalyst may be selected from the group of noble metal based catalysts and organic catalysts. Examples of said noble metal based catalysts may include, but are not limited to, Pt, Pt—Ru and the like.

<53> In any one of the above items <46> to <52>, said catalyst may have a particle diameter of 30 nm or less, preferably 10 nm or less, more preferably 3 nm or less.

<54> In any one of the above items <46> to <53>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<55> In the above item <54>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P—R^1—SO_3H)_2$, $Zr(O_3P—R^1—SO_3H)_2.nH_2O$, $Zr(O_3P—R^2—SO_3H)_{2-x}(O_3P—R^3—COOH)_x$, and $Zr(O_3P—R^2—SO_3H)_{2-x}(O_3P—R^3—COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<56> In the above item <54>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <54>, said cerium compound may be at least one selected from the group consisting of $CeO_2$, $CeO_2.nH_2O$, $Ce(HPO_4)_2$ and $Ce(HPO_4)_2.nH_2O$. In the above item <54>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <54>, said tin compound may be $SnO_2$ or $SnO_2.nH_2O$. In the above item <54>, said vanadium compound may be $V_2O_5$ or $V_2O_5.nH_2O$. In the above item <54>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <54>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<57> In any one of the above items <46> to <56>, said proton-conductive inorganic nanoparticle may have a Stokes particle diameter, determined by Dynamic Light Scattering method, of 20 nm or less, preferably 10 nm or less, more preferably 5 nm or less.

<58> In any one of the above items <46> to <57>, said proton-conductive inorganic nanoparticle may have a proton conductivity of the order of $1 \times 10^{-5}$ S/cm, preferably of the order of $1 \times 10^{-3}$ S/cm, more preferably of the order of $1 \times 10^{-2}$ S/cm at temperature of 20-150° C.

<59> In any one of the above items <46> to <58>, said proton-conductive polymer may be one or more of hydrocarbon-based polymers, preferably heat-resistant hydrocarbon-based polymers, which can be dissolved in polar organic solvent.

<60> In the above item <59>, said polar organic solvent may be selected from the group consisting of N,N-dimethylformamide, dimethyl sulfoxide, 1-methylpyrrolidone and N-acetamide.

<61> In any one of the above items <46> to <60>, said proton-conductive polymer may be one or more of sulfonated hydrocarbon-based polymers.

<62> In any one of the above items <46> to <61>, said proton-conductive polymer may be chemically bound to said proton-conductive inorganic nanoparticle.

<63> A method of preparing a catalyst layer used for a fuel cell, which comprises a electron-conductor, a catalyst and a proton-conductive hybrid material, comprising the steps of:
   a) carrying said catalyst with said electron-conductor;
   b) preparing a proton-conductive hybrid material dispersion in which said proton-conductive hybrid material is dispersed in a polar organic solvent;
   c) mixing said dispersion with said electron-conductor carried with said catalyst, to obtain a mixture; and
   d) applying said mixture to a diffusion layer used for a fuel cell, to obtain said catalyst layer used for a fuel cell;
   wherein said proton-conductive hybrid material comprises a proton-conductive inorganic nanoparticle and proton-conductive polymer, and
   a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<64> In the above item <63>, the method may further comprise a step of mixing a binder with said mixture, during the step c), or after the step c) and prior to the step d).

<65> In the above item <63> or <64>, the method may further comprise a step of removing solvent in said mixture, to adjust viscosity of said mixture.

<66> In any one of the above items <63> to <65>, the step b) may comprise the steps of:
   dissolving said proton-conductive polymer in a first polar organic solvent selected from the group of consisting of N,N-dimethylformamide, dimethyl sulfoxide, 1-methylpyrrolidone and N-methyl acetamide, to obtain a polymer solution;
   dispersing said proton-conductive nanoparticle in a second polar organic solvent, which is the same as or different from said first polar organic solvent, selected from the group of consisting of N,N-dimethylformamide, dimethyl sulfoxide, 1-methylpyrrolidone and N-methyl acetamide, to obtain a nanoparticle dispersion;

pouring said polymer solution into said nanoparticle dispersion or vice versa.

<67> In the above item <66>, the step b) may further comprise a step of adding a poor organic solvent for said proton-conductive polymer into the resultant dispersion, to obtain said proton-conductive hybrid material with smaller Stokes particle diameter.

<68> In the above item <67>, said poor organic solvent may be selected from the group consisting of methanol, ethanol, isopropanol, butanol and hexane, preferably isopropanol.

<69> In the step b) of any one of the above items <63> to <68>, said proton-conductive polymer may react with said proton-conductive inorganic nanoparticle, and one end of a part or all of said proton-conductive polymer may be chemically bound to said proton-conductive inorganic nanoparticle.

<70> In any one of the above items <63> to <69>, said catalyst layer used for a fuel cell may be constructed such that said catalyst may be carried at the surface of said electron-conductor, and that said proton-conductive hybrid material may be located near the position where said catalyst is located.

<71> In any one of the above items <63> to <70>, said proton-conductive hybrid material may be chemically and/or physically bound to said electron-conductor.

<72> In any one of the above items <63> to <71>, said electron-conductor may be a carbon-based porous electron-conductor or metal-based porous electron-conductor, preferably carbon-based porous electron-conductor.

<73> In the above item <72>, the carbon-based porous electron-conductor may be selected from the group consisting of carbon black, acetylene black, graphite, carbon fiber, carbon nanotube, fullerene, activated carbon, and glass carbon.

<74> In any one of the above items <63> to <73>, said electron-conductor may have a particle diameter of 300 nm or less, preferably 100 nm or less, more preferably 30 nm or less.

<75> In any one of the above items <63> to <74>, said catalyst may be selected from the group of noble metal based catalysts and organic catalysts. Examples of said noble metal based catalysts may include, but are not limited to, Pt, Pt—Ru and the like.

<76> In any one of the above items <63> to <75>, said catalyst may have a particle diameter of 30 nm or less, preferably 10 nm or less, more preferably 3 nm or less.

<77> In any one of the above items <63> to <76>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<78> In the above item <77>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P-R^1-SO_3H)_2$, $Zr(O_3P-R^1-SO_3H)_2.nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<79> In the above item <77>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <77>, said cerium compound may be at least one selected from the group consisting of $CeO_2$, $CeO_2.nH_2O$, $Ce(HPO_4)_2$ and $Ce(HPO_4)_2.nH_2O$. In the above item <77>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <77>, said tin compound may be $SnO_2$ or $SnO_2.nH_2O$. In the above item <77>, said vanadium compound may be $V_2O_5$ or $V_2O_5.nH_2O$. In the above item <77>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <77>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<80> In any one of the above items <63> to <79>, said proton-conductive inorganic nanoparticle may have a Stokes particle diameter, determined by Dynamic Light Scattering method, of 20 nm or less, preferably 10 nm or less, more preferably 5 nm or less.

<81> In any one of the above items <63> to <80>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<82> In any one of the above items <63> to <81>, said proton-conductive polymer may be one or more of hydrocarbon-based polymers, preferably heat-resistant hydrocarbon-based polymers, which can be dissolved in polar organic solvent.

<83> In any one of the above items <66> to <82>, said polar organic solvent may be selected from the group consisting of N,N-dimethylformamide, dimethyl sulfoxide, 1-methylpyrrolidone and N-acetamide.

<84> In any one of the above items <66> to <83>, said proton-conductive polymer may be one or more of sulfonated hydrocarbon-based polymers.

<85> An electrolyte membrane used for a fuel cell, comprising a proton-conductive hybrid material,
wherein said proton-conductive hybrid material comprises a proton-conductive nanoparticle and proton-conductive polymer, and
a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<86> In the above item <85>, said electrolyte membrane may have a substrate, and said proton-conductive hybrid material may be chemically and/or physically bound to said substrate.

<87> In the above item <86>, said substrate may be selected from the group consisting of porous polymers and porous ceramics. Examples of porous polymers may include polyimide, polyethylene and the like. Examples of porous ceramics may include alumina, silica, zirconia, titania and the like.

<88> In any one of the above items <85> to <87>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<89> In the above item <88>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P-R^1-SO_3H)_2$, $Zr(O_3P-R^1-SO_3H)_2.nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<90> In the above item <88>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <88>, said cerium compound may be at least one selected from the group consisting of $CeO_2$, $CeO_2.nH_2O$, $Ce(HPO_4)_2$ and $Ce(HPO_4)_2.nH_2O$. In the above item <88>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <88>, said tin compound may be $SnO_2$ or $SnO_2.nH_2O$. In the above item <88>, said vanadium compound may be $V_2O_5$ or $V_2O_5.nH_2O$. In the above item <88>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <88>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<91> In any one of the above items <85> to <90>, said proton-conductive inorganic nanoparticle may have a Stokes particle diameter, determined by Dynamic Light Scattering method, of 20 nm or less, preferably 10 nm or less, more preferably 5 nm or less.

<92> In any one of the above items <85> to <91>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<93> In any one of the above items <85> to <92>, said proton-conductive polymer may be one or more of hydrocarbon-based polymers, preferably heat-resistant hydrocarbon-based polymers, which can be dissolved in polar organic solvent.

<94> In the above item <93>, said polar organic solvent may be selected from the group consisting of N,N-dimethylformamide, dimethyl sulfoxide, 1-methylpyrrolidone and N-acetamide.

<95> In any one of the above items <85> to <94>, said proton-conductive polymer may be one or more of sulfonated hydrocarbon-based polymers.

<96> In any one of the above items <85> to <95>, said proton-conductive polymer may be chemically bound to said proton-conductive inorganic nanoparticle.

<97> In any one of the above items <85> to <96>, said electrolyte membrane used for a fuel cell may have a proton conductivity of $10^{-2}$ S/cm to 5 S/cm at temperature of −20 to 150° C. under low and high humidity conditions.

<98> A method of preparing an electrolyte membrane used for a fuel cell, which comprises a porous substrate and a proton-conductive hybrid material, comprising the steps of:

x) preparing a proton-conductive hybrid material dispersion in which said proton-conductive hybrid material is dispersed in a polar organic solvent; and y) applying said dispersion to pores of said electrolyte membrane or pores and surface of said electrolyte membrane, to obtain said electrolyte membrane used for a fuel cell;

wherein said proton-conductive hybrid material comprises a proton-conductive inorganic nanoparticle and proton-conductive polymer, and a Stokes particle diameter of said proton-conductive hybrid material determined by Dynamic Light Scattering method is 20 nm or less, preferably 10 nm or less, more preferably 5 nm or less. Preferably, said proton-conductive polymer is located in the vicinity of said proton-conductive inorganic nanoparticle, and more preferably, said proton-conductive inorganic nanoparticle is surrounded by said proton-conductive polymer.

<99> In the above item <98>, the step x) may comprise the steps of:

dissolving said proton-conductive polymer in a first polar organic solvent selected from the group of consisting of N,N-dimethylformamide, dimethyl sulfoxide, 1-methylpyrrolidone and N-methyl acetamide, to obtain a polymer solution;

dispersing said proton-conductive nanoparticle in a second polar organic solvent, which is the same as or different from said first polar organic solvent, selected from the group of consisting of N,N-dimethylformamide, dimethyl sulfoxide, 1-methylpyrrolidone and N-methyl acetamide, to obtain a nanoparticle dispersion;

pouring said polymer solution into said nanoparticle dispersion or vice versa.

<100> In the above item <99>, the step b) may further comprise a step of adding a poor organic solvent for said proton-conductive polymer into the resultant dispersion, to obtain said proton-conductive hybrid material with smaller Stokes particle diameter.

<101> In the above item <100>, said poor organic solvent may be selected from the group consisting of methanol, ethanol, isopropanol, butanol and hexane, preferably isopropanol.

<102> In the step x) of any one of the above items <98> to <101>, said proton-conductive polymer may react with said proton-conductive inorganic nanoparticle, and one end of a part or all of said proton-conductive polymer may be chemically bound to said proton-conductive inorganic nanoparticle.

<103> In the step y) of any one of the above items <98> to <102>, said proton-conductive polymer may react with said pores and/or said surface of said substrate, and one end of a part or all of said proton-conductive polymer may be chemically bound to said substrate.

<104> In any one of the above items <98> to <103>, said substrate may be selected from the group consisting of porous polymers and porous ceramics. Examples of porous polymers may include polyimide, polyethylene and the like. Examples of porous ceramics may include alumina, silica, zirconia, titania and the like.

<105> In any one of the above items <98> to <104>, said proton-conductive inorganic nanoparticle may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<106> In the above item <105>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P-R^1-SO_3H)_2$, $Zr(O_3P-R^1-SO_3H)_2.nH_2O$, $Zr(O_3P-R^2-SO_3H)_{2-x}$ $(O_3P—R^3—COOH)_x$, and $Zr(O_3P—R^2—SO_3H)_{2-x}(O_3P—R^3—COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<107> In the above item <105>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <105>, said cerium compound may be at least one selected from the group consisting of $CeO_2$, $CeO_2.nH_2O$, $Ce(HPO_4)_2$ and $Ce(HPO_4)_2.nH_2O$. In the above item <105>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <105>, said tin compound may be $SnO_2$ or $SnO_2.nH_2O$. In the above item <105>, said vanadium compound may be $V_2O_5$ or $V_2O_5.nH_2O$. In the above item <105>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <105>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<108> In any one of the above items <98> to <107>, said proton-conductive inorganic nanoparticle may have a Stokes particle diameter, determined by Dynamic Light Scattering method, of 20 nm or less, preferably 10 nm or less, more preferably 5 nm or less.

<109> In any one of the above items <98> to <108>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<110> In any one of the above items <98> to <109>, said proton-conductive polymer may be one or more of hydrocarbon-based polymers, preferably heat-resistant hydrocarbon-based polymers, which can be dissolved in polar organic solvent.

<111> In any one of the above items <99> to <110>, said polar organic solvent may be selected from the group consisting of N,N-dimethylformamide, dimethyl sulfoxide, and 1-methylpyrrolidone.

<112> In any one of the above items <98> to <111>, said proton-conductive polymer may be one or more of sulfonated hydrocarbon-based polymers.

<113> A dispersion comprising a proton-conductive inorganic nanoparticle or precursor for said proton-conductive inorganic nanoparticle and polar organic solvent, wherein said proton-conductive inorganic nanoparticle or precursor therefor is evenly dispersed in said polar organic solvent, and a Stokes particle diameter of said proton-conductive nanoparticle or precursor therefor determined by Dynamic Light Scattering method is 20 nm or less, preferably 10 nm or less, more preferably 5 nm or less, most preferably 2 nm or less.

<114> In the above item <113>, said polar organic solvent is selected from the group consisting of N,N-dimethylformamide, dimethyl sulfoxide, 1-methylpyrrolidone and N-methyl acetamide.

<115> In the above item <113> or <114>, said proton-conductive inorganic nanoparticle or precursor therefor may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<116> In the above item <115>, said zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P—R^1—SO_3H)_2$, $Zr(O_3P—R^1—SO_3H)_2.nH_2O$, $Zr(O_3P—R^2—SO_3H)_{2-x}(O_3P—R^3—COOH)_x$, and $Zr(O_3P—R^2—SO_3H)_{2-x}(O_3P—R^3—COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<117> In the above item <115>, said titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$. In the above item <115>, said cerium compound may be at least one selected from the group consisting of $CeO_2$, $CeO_2.nH_2O$, $Ce(HPO_4)_2$ and $Ce(HPO_4)_2.nH_2O$. In the above item <115>, said uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$. In the above item <115>, said tin compound may be $SnO_2$ or $SnO_2.nH_2O$. In the above item <115>, said vanadium compound may be $V_2O_5$ or $V_2O_5.nH_2O$. In the above item <115>, said antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10. In the above item <115>, said calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

<118> In any one of the above items <113> to <117>, said proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

<119> A method of preparing a dispersion, which comprises a proton-conductive inorganic nanoparticle or precursor for said proton-conductive inorganic nanoparticle and polar organic solvent, comprising the steps of:

i) preparing said proton-conductive inorganic nanoparticle or precursor therefor; and ii) evenly dispersing said proton-conductive inorganic nanoparticle or precursor therefor in said polar organic solvent;

wherein a Stokes particle diameter of said proton-conductive nanoparticle or said precursor therefor determined by Dynamic Light Scattering method is 20 nm or less, preferably 10 nm or less, more preferably 5 nm or less, most preferably 2 nm or less.

<120> In the above item <119>, the step of preparing said proton-conductive inorganic nanoparticle or precursor therefor may comprise the steps of:

preparing a solution of metal alkoxide, in which metal represents one selected from the group consisting of zirconium, titanium, cerium, uranium, tin, vanadium, antimony and calcium, preferably zirconium, in organic solvent; and hydrolyzing said solution, to obtain said proton-conductive inorganic nanoparticle or precursor therefor.

<121> In the above item <119> or <120>, said polar organic solvent is selected from the group consisting of N,N-dimethylformamide, dimethyl sulfoxide, 1-methylpyrrolidone and N-methyl acetamide.

<122> In the above item <119> to <121>, said proton-conductive inorganic nanoparticle or precursor therefor may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

<123> In the above item <122>, said zirconium compound may be at least one selected from the group consisting of $ZrO_2$, $ZrO_2 \cdot nH_2O$, $Zr(HPO_4)_2$, $Zr(HPO_4)_2 \cdot nH_2O$, $Zr(HSO_3)_2$, $Zr(HSO_3)_2 \cdot nH_2O$, $Zr(O_3P-R^1-SO_3H)_2$, $Zr(O_3P-R^1-SO_3H)_2 \cdot nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x \cdot nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

<124> In the above item <122>, said titanium compound may be at least one selected from the group consisting of $TiO_2$, $TiO_2 \cdot nH_2O$, $Ti(HPO_4)_2$, $Ti(HPO_4)_2 \cdot nH_2O$, $Ti(HSO_3)_2$ and $Ti(HSO_3)_2 \cdot nH_2O$. In the above item <122>, said cerium compound may be at least one selected from the group consisting of $CeO_2$, $CeO_2 \cdot nH_2O$, $Ce(HPO_4)_2$ and $Ce(HPO_4)_2 \cdot nH_2O$. In the above item <122>, said uranium compound may be at least one selected from the group consisting of $H_3OUO_4PO_4$, $H_3OUO_4PO_4 \cdot nH_2O$, $H_3OUO_2AsO_4$ and $H_3OUO_2AsO_4 \cdot nH_2O$. In the above item <122>, said tin compound may be $SnO_2$ or $SnO_2 \cdot nH_2O$. In the above item <122>, said vanadium compound may be $V_2O_5$ or $V_2O_5 \cdot nH_2O$. In the above item <122>, said antimony compound may be at least one selected from the group consisting of $Sb_2O_5$, $Sb_2O_5 \cdot nH_2O$, $HSbO_3$, $HSbO_3 \cdot nH_2O$, $H_2SbO_{11}$, $H_2SbO_{11} \cdot nH_2O$, $H_xSb_xP_2O_3$ and $H_xSb_xP_2O_3 \cdot nH_2O$, wherein x represents 1, 3 or 5 and n is 2-10. In the above item <122>, said calcium hydroxyapatite and hydrated calcium hydroxyapatites may be at least one selected from the group consisting of $Ca_{10}(PO_4)X_2$ and $Ca_{10}(PO_4)X_2 \cdot nH_2O$, wherein X represents —OH and/or —F.

<125> In any one of the above items <119> to <124>, said proton-conductive inorganic nanoparticle may have a proton conductivity of the order of $1 \times 10^{-5}$ S/cm, preferably of the order of $1 \times 10^{-3}$ S/cm, more preferably of the order of $1 \times 10^{-2}$ S/cm at temperature of 20-150° C.

<126> A proton-conductive hybrid material comprising a proton-conductive inorganic mesoporous material and a proton-conductive polymer, wherein a pore diameter of said proton-conductive inorganic mesoporous material is 20 nm or less, preferably 10 nm or less, more preferably 5 nm or less, most preferably 2 nm or less. Preferably, said proton-conductive polymer is located in the vicinity of a pore of said proton-conductive inorganic mesoporous material, and more preferably, said proton-conductive polymer is surrounded by said proton-conductive inorganic mesoporous material.

<127> In the above item <126>, said proton-conductive inorganic mesoporous material may be at least one selected from the group consisting of mesoporous zirconium compounds, mesoporous titanium compounds, mesoporous cerium compounds, mesoporous uranium compounds, mesoporous tin compounds, mesoporous vanadium compounds, mesoporous antimony compounds, and mesoporous calcium hydroxyapatite and mesoporous hydrated calcium hydroxyapatites, preferably mesoporous zirconium compounds. In particular, mesoporous compounds may have a functional group. Examples of the functional group may include, but are not limited to, —$SO_3H$, —$PO_4$, and the like.

<128> In the above item <127>, said mesoporous zirconium compound may be at least one selected from the group consisting of mesoporous $ZrO_2$, mesoporous $ZrO_2 \cdot nH_2O$, mesoporous $Zr(HPO_4)_2$, mesoporous $Zr(HPO_4)_2 \cdot nH_2O$, mesoporous $Zr(HSO_3)_2$, mesoporous $Zr(HSO_3)_2 \cdot nH_2O$, mesoporous $Zr(O_3P-R^1-SO_3H)_2$, mesoporous $Zr(O_3P-R^1-SO_3H)_2 \cdot nH_2O$, mesoporous $Zr(O_3P-R^2-SO_3H)_{2-x}(O_3P-R^3-COOH)_x$, and mesoporous $Zr(O_3P-R^2-SO_3H)_{2-x}(O_3P-R^3-COOH)_x \cdot nH_2O$, wherein $R^1$, $R^2$, and $R^3$ each independently represents a bivalent group, preferably $R^1$ and $R^2$ each independently represents a bivalent aromatic group, and $R^3$ represents an alkylene group. In particular, mesoporous zirconium compounds may have a functional group. Examples of the functional group may include, but are not limited to, —$SO_3H$, —$PO_4$, and the like.

<129> In the above item <127>, said titanium compound may be at least one selected from the group consisting of mesoporous $TiO_2$, mesoporous $TiO_2 \cdot nH_2O$, mesoporous $Ti(HPO_4)_2$, mesoporous $Ti(HPO_4)_2 \cdot nH_2O$, mesoporous $Ti(HSO_3)_2$ and mesoporous $Ti(HSO_3)_2 \cdot nH_2O$. In the above item <127>, said cerium compound may be at least one selected from the group consisting of mesoporous $CeO_2$, mesoporous $CeO_2 \cdot nH_2O$, mesoporous $Ce(HPO_4)_2$ and mesoporous $Ce(HPO_4)_2 \cdot nH_2O$. In the above item <127>, said uranium compound may be at least one selected from the group consisting of mesoporous $H_3OUO_4PO_4$, mesoporous $H_3OUO_4PO_4 \cdot nH_2O$, mesoporous $H_3OUO_2AsO_4$ and mesoporous $H_3OUO_2AsO_4 \cdot nH_2O$. In the above item <127>, said tin compound may be mesoporous $SnO_2$ or mesoporous $SnO_2 \cdot nH_2O$. In the above item <127>, said vanadium compound may be mesoporous $V_2O_5$ or mesoporous $V_2O_5 \cdot nH_2O$. In the above item <127>, said antimony compound may be at least one selected from the group consisting of mesoporous $Sb_2O_5$, mesoporous $Sb_2O_5 \cdot nH_2O$, mesoporous $HSbO_3$, mesoporous $HSbO_3 \cdot nH_2O$, mesoporous $H_2SbO_{11}$, mesoporous $H_2SbO_{11} \cdot nH_2O$, mesoporous $H_xSb_xP_2O_3$ and mesoporous $H_xSb_xP_2O_3 \cdot nH_2O$, wherein x represents 1, 3 or 5 and n is 2-10. In the above item <127>, said calcium hydroxyapatite and hydrated calcium hydroxyapatites may be at least one selected from the group consisting of mesoporous $Ca_{10}(PO_4)X_2$ and mesoporous $Ca_{10}(PO_4)X_2 \cdot nH_2O$, wherein X represents —OH and/or —F. In particular, each of mesoporous compounds may have a functional group. Examples of the functional group may include, but are not limited to, —$SO_3H$, —$PO_4$, and the like.

<130> In any one of the above items <126> to <129>, said proton-conductive inorganic mesoporous material may have a proton conductivity of the order of $1 \times 10^{-5}$ S/cm, preferably of the order of $1 \times 10^{-3}$ S/cm, more preferably of the order of $1 \times 10^{-2}$ S/cm at temperature of 20-150° C.

<131> In any one of the above items <126> to <130>, said proton-conductive polymer may be one or more of hydrocarbon-based polymers, preferably heat-resistant hydrocarbon-based polymers, which can be dissolved in polar organic solvent.

<132> In the above item <131>, said polar organic solvent may be selected from the group consisting of N,N-dimethylformamide, dimethyl sulfoxide, 1-methylpyrrolidone and N-methyl acetamide, preferably the group consisting of N,N-dimethylformamide, dimethyl sulfoxide and 1-methylpyrrolidone.

<133> In any one of the above items <126> to <132>, said proton-conductive polymer may be one or more of sulfonated hydrocarbon-based polymers.

<134> In any one of the above items <126> to <133>, said proton-conductive polymer may be chemically bound to said proton-conductive inorganic mesoporous material.

<135> In any one of the above items <126> to <134>, said proton-conductive hybrid material may have a proton conductivity of $10^{-3}$ S/cm to 1 S/cm at temperature of −20 to 150° C. under low and high humidity conditions.

<136> A fuel cell comprising a proton-conductive hybrid material in any one of the above items <1> to <11>.

<137> A fuel cell comprising a catalyst layer in any one of the above items <46> to <62>.

<138> A fuel cell comprising an electrolyte membrane in any one of the above items <85> to <97>.

<139> A fuel cell comprising a proton-conductive hybrid material in any one of the above items <126> to <135>.

<140> A catalyst layer used for a fuel cell comprising a proton-conductive hybrid material in any one of the above items <126> to <135>.

<141> A fuel cell comprising a catalyst layer in the above item <140>.

<142> An electrolyte membrane used for a fuel cell comprising a proton-conductive hybrid material in any one of the above items <126> to <135>.

<143> A fuel cell comprising an electrolyte membrane in the above item <142>.

Effects of the Invention

The present invention can provide an organic-inorganic hybrid material which can show higher proton conductivity in a wide temperature range from low temperatures to high temperatures.

Further, in addition to the above-described effect, the present invention can provide an organic-inorganic hybrid material which can show higher proton conductivity in a wide temperature range and at low humidities.

More, in addition to, or other than the above-described effects, the present invention can provide a proton-conductive material whose particle diameter has been controlled so that the material can reach small pores, for example, the pores of primary particles of carbon powder.

Further, the present invention can provide a catalyst layer for fuel cell and an electrolyte membrane for fuel cell including the above-described material, and a fuel cell including the catalyst layer and electrolyte membrane.

More, the present invention can provide methods for producing the above-described material, catalyst layer, electrolyte membrane, and fuel cell.

PREFERRED EMBODIMENTS FOR CARRYING OUT THE PRESENT INVENTION

The present invention will be described in detail hereinafter.

<Proton Conductive Hybrid Material>

The present invention provides a proton conductive hybrid material which comprises a proton-conductive inorganic nanoparticle and a proton-conductive polymer. In particular, the proton conductive hybrid material according to the present invention is characterized in that a Stokes particle diameter of the material determined by Dynamic Light Scattering method is 20 nm or less, preferably 10 nm or less, more preferably 5 nm or less.

Further, the proton conductive hybrid material may have a proton conductivity of $10^{-3}$ S/cm to 1 S/cm at temperature of −20 to 150° C. under low and high humidity conditions.

More, in the material according to the present invention, the proton-conductive polymer may be chemically bound to the proton-conductive inorganic nanoparticle.

The material according to the present invention is an organic-inorganic hybrid material, and may provide higher proton conductivity in a wide temperature range from low temperatures to high temperatures. In addition, the material according to the present invention may provide higher proton conductivity in a wide temperature range and at low humidities. Further, since the material according to the present invention has a sufficiently small Stokes particle diameter, and thus can reach the pores of primary particles of, for example, carbon powder, the material may be readily used for, for example, the catalyst layer for fuel cell as described below.

In the material according to the present invention, the proton-conductive polymer may be located in the vicinity of the proton-conductive inorganic nanoparticle, and more preferably, the proton-conductive inorganic nanoparticle may be surrounded by the proton-conductive polymer.

The proton-conductive inorganic nanoparticle of the material according to the present invention may be at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites, preferably zirconium compounds.

Among the above-described compounds, the zirconium compound may be at least one selected from the group consisting of $ZrO_2$, $ZrO_2.nH_2O$, $Zr(HPO_4)_2$, $Zr(HPO_4)_2.nH_2O$, $Zr(HSO_3)_2$, $Zr(HSO_3)_2.nH_2O$, $Zr(O_3P-R^1-SO_3H)_2$, $Zr(O_3P-R^1-SO_3H)_2.nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group.

Further, the titanium compound may be at least one selected from the group consisting of $TiO_2$, $TiO_2.nH_2O$, $Ti(HPO_4)_2$, $Ti(HPO_4)_2.nH_2O$, $Ti(HSO_3)_2$ and $Ti(HSO_3)_2.nH_2O$.

The cerium compound may be at least one selected from the group consisting of $CeO_2$, $CeO_2.nH_2O$, $Ce(HPO_4)_2$ and $Ce(HPO_4)_2.nH_2O$.

The uranium compound may be at least one selected from the group consisting of $H_3OUO_4PO_4$, $H_3OUO_4PO_4.nH_2O$, $H_3OUO_2AsO_4$ and $H_3OUO_2AsO_4.nH_2O$.

The tin compound may be $SnO_2$ or $SnO_2.nH_2O$.

The vanadium compound may be $V_2O_5$ or $V_2O_5.nH_2O$.

The antimony compound may be at least one selected from the group consisting of $Sb_2O_5$, $Sb_2O_5.nH_2O$, $HSbO_3$, $HSbO_3.nH_2O$, $H_2SbO_{11}$, $H_2SbO_{11}.nH_2O$, $H_xSb_xP_2O_3$ and $H_xSb_xP_2O_3.nH_2O$, wherein x represents 1, 3 or 5 and n is 2-10.

The calcium hydroxyapatite and hydrated calcium hydroxyapatites may be at least one selected from the group consisting of $Ca_{10}(PO_4)X_2$ and $Ca_{10}(PO_4)X_2.nH_2O$, wherein X represents —OH and/or —F.

The proton-conductive inorganic nanoparticle according to the present invention may have a Stokes particle diameter, determined by Dynamic Light Scattering method, of 20 nm or less, preferably 10 nm or less, more preferably 5 nm or less.

Further, the proton-conductive inorganic nanoparticle may have a proton conductivity of the order of $1\times10^{-5}$ S/cm, preferably of the order of $1\times10^{-3}$ S/cm, more preferably of the order of $1\times10^{-2}$ S/cm at temperature of 20-150° C.

More, the proton-conductive inorganic nanoparticle may be prepared by the following process [1] or [2]:

[1. Structural and Surface Modification of Layered Zirconium Phosphate $Zr(HPO)_4$]

Synthesis of Zirconium Phosphonates:

In phosphated Zirconia, the conductivity is dominated by surface transport. Namely, due to steric effects, the diffusion or reorientation of protonic species on the surface should be easier than in the bulk; in addition the surface ionogenic groups can be more hydrated than the inner ones, thus facilitating the water protonation.

The distance between neighbouring phosphate groups (0.53 nm) (see FIG. 5) is too large to permit proton diffusion in the absence of water molecules forming bridges between the P—OH groups. Consequently, the number and arrangement of these molecules determine the conduction characteristics.

When the pendant R group of alpha-$Zr(RPO_3)_2$ contains a polar group with exchangeable protons such as —COOH, —$SO_3H$, etc, the compound is an organic ion exchanger possessing an inorganic backbone, are known as phosphonates. These materials are of interest due to the thermal vibrations of the long chains, the terminal acid group could approach each other at a distance shorter than those between adjacent $PO_3$ sites (0.53 nm). Thus, proton jumps from one acid group to another with a mechanism (Tarzan Mechanism).

Therefore, zirconium phosphate with —$SO_3H$ groups and on mixed phosphate with —$SO_3H$ and —COOH groups attached to long aliphatic chains (zirconium phosphonates) will be synthesized. Such materials will show 2-3 fold increase in proton conductivity compared to the normal ZrP.

[2. Synthesis and Functionalization of Meso/Nano Porous Zirconium Hydrogen Phosphate]

Nanosized hexagonal mesoporous zirconia will be synthesized by self assembly technique and the inner walls will be functionalized using aromatic sulfonic acid groups. Homogeneous nanocomposites will be made and applied for pore filling membranes.

Further, proton conducting materials developed will be the derivatives of hydrated zirconia, sulfated and phosphated zirconia doped with other oxides such as titania and alumina.

The proton-conductive polymer of the material according to the present invention may be one or more of hydrocarbon-based polymers, preferably heat-resistant hydrocarbon-based polymers, which can be dissolved in polar organic solvent.

The polar organic solvent may be selected from the group consisting of N,N-dimethylformamide, dimethyl sulfoxide, 1-methylpyrrolidone and N-methylacetamide, preferably the group consisting of N,N-dimethylformamide, dimethyl sulfoxide and 1-methylpyrrolidone.

Examples of the hydrocarbon-based polymer may include polyetherketone, polysulfide, polyphosphazene, polyphenylene, polybenzoimidazole, polyether sulfone, polyphenylene oxide, polycarbonate, polyurethane, polyamide, polyimide, polyurea, polysulfone, polysulfonate, polybenzoxazole, polybenzothiazole, polythiazole, polyphenyl quinoxaline, polyquinoline, polysiloxane, polytriazine, polydiene, polypyridine, polypyrimidine, polyoxathiazole, polytetraxabilen, polyoxazole, polyvinylpyridine, polyvinyl imidazole, polypyrrolidone, polyacrylate derivatives, polymethacrylate derivatives, polystyrene derivatives and the like. Among them, polyether ketone, polysulfide, polyphosphazene, polyphenylene, polybenzoimidazole, polyether sulfone, polyphenylene oxide, polycarbonate, polyurethane, polyamide, polyimide, polyurea, polysulfone, polysulfonate, polybenzoxazole, polybenzothiazole, polyphenyl quinoxaline, polyquinoline, polytriazine, polydiene, polypyridine, polyoxathiazole, polyacrylate derivatives, polymethacrylate derivatives, and polystyrene derivatives are preferable. And, polyetherketone, polysulfide, polyphosphazene, polyphenylene, polybenzoimidazole, polyether sulfone, polyphenylene oxide, polycarbonate, polyamide, polyimide, polyurea, polysulfone, polysulfonate, polybenzoxazole, polybenzothiazole, polyphenyl quinoxaline, polyquinoline, polytriazine, polydiene, polyacrylate derivatives, polymethacrylate derivatives, polystyrene derivatives are more preferable.

The proton-conductive polymer may have a protonic acid group. Examples of the protonic acid group may include, but not limited to, a sulfonic acid group, a carboxylic acid group, a phosphonic acid group, an alkyl sulfonic acid group, an alkyl carboxyl acid group, an alkyl phosphonic acid group, a phosphate group, and a phenolic hydroxy group.

The proton-conductive polymer may have an ion exchange volume of 0.1 to 4.5 meq/g, preferably 0.2 to 4.0 meq/g, and more preferably 0.25 to 4.5 meq/g. The ion exchange volume represents milliequivalent per 1 g of the polymer (meq/g).

The proton-conductive polymer may be one or more of sulfonated hydrocarbon-based polymers.

The proton-conductive polymer may be a sulfonic acid group-containing polyether sulfone, a sulfonic acid group-containing polyether ketone, a sulfonic acid group-containing polyether ether ketone, a sulfonic acid group-containing polyimide or the like.

Examples of the proton-conductive polymer may include the following sulfonated polymer: i.e., SPEEK: sulfonated polyetheretherketone, SPEK: sulfonated polyetherketone, SPES: polyethersulfone, SP3O: poly(2,6-diphenyl-4-phenylene oxide), SPPBP: sulfonatedpoly(4-phenoxybenzoyl-1, 4-phenylene), SPPO: sulfonated polyphenyleneoxide or poly (2,6-dimethyl-1,4-phenyleneoxide), SPPQ: poly (phenylquinoxalines), SPS: sulfonated polystyrene, SPSF: sulfonated polysulfone, SPSU: sulfonated polysulfone Udel.

<A Dispersion Comprising a Proton-Conductive Hybrid Material and Polar Organic Solvent>

The present invention provides a dispersion comprising a proton-conductive hybrid material and polar organic solvent.

In the dispersion according to the present invention, the proton-conductive hybrid material is evenly dispersed in the polar organic solvent selected from the group consisting of N,N-dimethylformamide, dimethyl sulfoxide, 1-methylpyrrolidone and N-methyl acetamide. The proton-conductive hybrid material comprises a proton-conductive inorganic nanoparticle and a proton-conductive polymer as described above.

In the dispersion according to the present invention, a Stokes particle diameter of the proton-conductive hybrid material determined by Dynamic Light Scattering method may be 20 nm or less, preferably 10 nm or less, more preferably 5 nm or less. Further, the proton-conductive polymer may preferably be located in the vicinity of the proton-conductive inorganic nanoparticle, and more preferably, the proton-conductive inorganic nanoparticle may be surrounded by the proton-conductive polymer.

Furthermore, the properties of the proton-conductive inorganic nanoparticle and the proton-conductive polymer is the same as described above.

<A Method of Preparing a Dispersion>

The dispersion described above can be prepared by, for example, the following method:

The method comprises the steps of:

dissolving a proton-conductive polymer in a first polar organic solvent selected from the group of consisting of N,N- dimethylformamide, dimethyl sulfoxide, 1-methylpyrrolidone and N-methyl acetamide, to obtain a polymer solution;

dispersing a proton-conductive nanoparticle in a second polar organic solvent, which is the same as or different from the first polar organic solvent, selected from the group of consisting of N,N-dimethylformamide, dimethyl sulfoxide, 1-methylpyrrolidone and N-methyl acetamide, to obtain a nanoparticle dispersion; and pouring the polymer solution into the nanoparticle dispersion or vice versa, to obtain the dispersion which comprises the polar organic solvent and the proton-conductive hybrid material.

The method may further comprise a step of adding a poor organic solvent for the proton-conductive polymer into the resultant dispersion, to obtain dispersion having the proton-conductive hybrid material with smaller Stokes particle diameter. The poor organic solvent may be selected from the group consisting of methanol, ethanol, isopropanol, butanol and hexane, preferably isopropanol.

The first and/or second polar organic solvent may be selected from the group consisting of N,N-dimethylformamide, dimethyl sulfoxide and 1-methylpyrrolidone.

In the step of pouring the polymer solution into the nanoparticle dispersion or the step of pouring the nanoparticle dispersion into the polymer solution, the proton-conductive polymer may react with the proton-conductive inorganic nanoparticle, and one end of a part or all of the proton-conductive polymer may be chemically bound to the proton-conductive inorganic nanoparticle.

<A Method of Preparing a Proton-Conductive Hybrid Material>

Further, the proton-conductive hybrid material described above can be prepared by the following method:

The method may comprise the steps of:

dissolving a proton-conductive polymer in a first polar organic solvent selected from the group of consisting of N,N-dimethylformamide, dimethyl sulfoxide, 1-methylpyrrolidone and N-methyl acetamide, to obtain a polymer solution;

dispersing a proton-conductive nanoparticle in a second polar organic solvent, which is the same as or different from the first polar organic solvent, selected from the group of consisting of N,N-dimethylformamide, dimethyl sulfoxide, 1-methylpyrrolidone and N-methyl acetamide, to obtain a nanoparticle dispersion;

pouring the polymer solution into the nanoparticle dispersion or vice versa, to obtain the dispersion which comprises the polar organic solvent and the a proton-conductive hybrid material; and removing the first and second polar organic solvent from the resulting dispersion, to obtain the proton-conductive hybrid material.

The first and/or second polar organic solvent may be selected from the group consisting of N,N-dimethylformamide, dimethyl sulfoxide and 1-methylpyrrolidone.

After obtaining the dispersion, the method may further comprise a step of adding a poor organic solvent for the proton-conductive polymer into the dispersion, to obtain dispersion having the proton-conductive hybrid material with smaller Stokes particle diameter. The poor organic solvent may be the same as described in the method of preparing the dispersion.

Further, in the step of pouring the polymer solution into the nanoparticle dispersion or the step of pouring the nanoparticle dispersion into the polymer solution, the proton-conductive polymer may react with the proton-conductive inorganic nanoparticle, and one end of a part or all of the proton-conductive polymer may be chemically bound to the proton-conductive inorganic nanoparticle.

As described above, the proton conductive hybrid material may be prepared by using the above-described method of preparing the dispersion.

<A Catalyst Layer Used for a Fuel Cell>

The present invention provides a catalyst layer used for a fuel cell, which comprises the above-described proton-conductive hybrid material. In particular, the present invention provides a catalyst layer used for a fuel cell, which comprises an electron-conductor, a catalyst and a proton-conductive hybrid material.

The catalyst layer comprises an electron-conductor, a catalyst and a proton-conductive hybrid material. For the proton-conductive hybrid material, the material described above, which has various properties, may be used.

The catalyst layer may be constructed such that the catalyst may be carried at the surface of the electron-conductor, and such that the proton-conductive hybrid material may be located near the position where the catalyst is located.

The proton-conductive hybrid material may be physically and/or chemically bound to the electron-conductor.

The electron-conductor may be a carbon-based porous electron-conductor or metal-based porous electron-conductor, preferably carbon-based porous electron-conductor.

The carbon-based porous electron-conductor may be selected from the group consisting of carbon black, acetylene black, graphite, carbon fiber, carbon nanotube, fullerene, activated carbon, and glass carbon.

The electron-conductor may have a particle diameter of 300 nm or less, preferably 100 nm or less, more preferably 30 nm or less.

The catalyst may be selected from the group of noble metal based catalysts and organic catalysts. Examples of the noble metal based catalysts may include, but are not limited to, Pt, Pt—Ru and the like.

The catalyst may have a particle diameter of 30 nm or less, preferably 10 nm or less, more preferably 3 nm or less.

<A Method of Preparing a Catalyst Layer>

The above-described catalyst layer used for a fuel cell may be prepared by the following method:

The method comprises the steps of:

a) carrying the catalyst with an electron-conductor;

b) preparing a proton-conductive hybrid material dispersion in which the proton-conductive hybrid material is dispersed in a polar organic solvent;

c) mixing the dispersion with the electron-conductor carried with the catalyst, to obtain a mixture; and d) applying the mixture to a diffusion layer used for a fuel cell, to obtain the catalyst layer used for a fuel cell.

Furthermore, the catalyst, the electron-conductor, the proton-conductive hybrid material, and the polar organic solvent, which are the same as described above, may be used.

Further, for the step b), the above-described method of preparing the dispersion may be used.

The method may further comprise a step of mixing a binder with the mixture, during the step c), or after the step c) and prior to the step d). Further, the method may further comprise a step of removing solvent in the mixture, to adjust viscosity of the mixture.

In the step b), the proton-conductive polymer may react with the proton-conductive inorganic nanoparticle, and one end of apart or all of the proton-conductive polymer may be chemically bound to the proton-conductive inorganic nanoparticle.

<An Electrolyte Membrane>

The present invention provides an electrolyte membrane comprising the above-described proton-conductive hybrid material.

The electrolyte membrane used for fuel cell may have a proton conductivity of $10^{-2}$ S/cm to 5 S/cm at temperature of −20 to 150° C. under low and high humidity conditions. Furthermore, the proton-conductive hybrid material, which has the above-described properties, may be used.

The electrolyte membrane may have a substrate, and the proton-conductive hybrid material may be chemically and/or physically bound to the substrate. The substrate may be selected from the group consisting of porous polymers and porous ceramics. Examples of porous polymers may include polyimide, polyethylene and the like. Examples of porous ceramics may include alumina, silica, zirconia, titania and the like.

The proton-conductive hybrid material may be chemically and/or physically bound to the surface (including the surface of pores) of the porous polymer or porous ceramics.

The proton-conductive hybrid material may be filled, fixed, and retained in pores of the substrate, specifically the porous substrate, thereby to obtain an electrolyte membrane.

The substrate preferably has a membrane thickness of 0.01 to 300 μm, preferably 0.1 to 100 μm, a porosity of 10 to 95%, more preferably 40 to 90%, a breaking strength of $1.961 \times 10^4$ kPa (200 kg/cm$^2$) or more, and an average through hole diameter of 0.001 to 100 μm.

In cases where the porous substrate is composed of a fluorine-based resin, the fluorine-based resin may be a known one having many carbon-fluorine bonds within one molecule thereof. The fluorine-based resin usually has a structure wherein all or most of hydrogen atoms, suitably 50 mol % or more of hydrogen atoms of polyolefin are substituted with fluorine atoms. It is particularly preferable that all the hydrogen atoms be substituted with fluorine atoms. With the use of the fluorine-based resin as the substrate, an electrolyte membrane having excellent mechanical strength, chemical stability, and heat resistance is provided.

Examples of the fluorine-based resin may include polytetrafluoroethylene (PTFE), polychlorotrifluoroethylene (CTFE), polyvinylidene fluoride (PVdF), tetrafluoroethylene-hexafluoropropylene copolymer (FEP), tetrafluoroethylene-perfluoroalkyl vinyl ether copolymer (PFA), tetrafluoroethylene-ethylene copolymer (ETFE), chlorotrifluoroethylene-ethylene copolymer (ECTFE) and the like. Among them, polytetrafluoroethylene (PTFE) and tetrafluoroethylene-hexafluoro propylene copolymer (FEP) are preferable, and PTFE is more preferable.

In cases where the substrate is composed of a hydrocarbon-based resin, examples of the resin may include polyethylene, polypropylene, polycarbonate, polyimide, polyester, polyether sulfone, polyether ketone, polyether ether ketone, polysulfone, polysulfide, polyamide, polyamide imide, polyphenylene, polyether, polyether imide, polyether amide and the like. Among them, from the viewpoint of heat stability, preferable examples may include, but are not limited to, polycarbonate, polyimide, polyester, polyether sulfone, polyether ketone, polyether ether ketone, polysulfone, polysulfide, polyamide, polyamide imide, polyphenylene, polyether, polyether imide, and polyether amide.

Furthermore, the porous substrate may be composed of a plural kinds of materials. For example, two or more kinds of the above-described fluorine-based resins and hydrocarbon-based resins may be used.

<A Method of Preparing an Electrolyte Membrane>

The above-described electrolyte membrane used for a fuel cell may be prepared by the following method:

The method comprises the steps of:

x) preparing a proton-conductive hybrid material dispersion in which the above-described proton-conductive hybrid material is dispersed in a polar organic solvent; and y) applying the dispersion to pores of a substrate or pores and surface of the substrate, to obtain the electrolyte membrane used for a fuel cell.

For the above-described step x), the above-described method of preparing the dispersion may be used. Further, for the proton-conductive hybrid material, the polar organic solvent, and the substrate, the above-described proton-conductive hybrid material, the above-described polar organic solvent, and the above-described substrate may be used, respectively.

<A Dispersion Comprising a Nanoparticle and Solvent>

The present invention provides a dispersion comprising a proton-conductive inorganic nanoparticle or proton-conductive inorganic nanoparticle precursor and the above-described polar organic solvent. The proton-conductive inorganic nanoparticle or proton-conductive inorganic nanoparticle precursor may be evenly dispersed in the polar organic solvent, and a Stokes particle diameter of the proton-conductive nanoparticle or precursor therefor determined by Dynamic Light Scattering method may be 20 nm or less, preferably 10 nm or less, more preferably 5 nm or less, most preferably 2 nm or less.

The proton-conductive inorganic nanoparticle or proton-conductive inorganic nanoparticle precursor is the same as the above-described proton-conductive inorganic nanoparticle or precursor therefor.

<A Method of Preparing a Dispersion (which Comprises a Nanoparticle and Solvent)>

The above-described dispersion, which comprises the above-described proton-conductive inorganic nanoparticle or proton-conductive inorganic nanoparticle precursor and the above-described polar organic solvent, may be prepared by the following method:

The method comprises the steps of:

i) preparing the proton-conductive inorganic nanoparticle or precursor therefor; and ii) evenly dispersing the proton-conductive inorganic nanoparticle or precursor therefor in the polar organic solvent.

The step of preparing the proton-conductive inorganic nanoparticle or precursor therefor may comprise the steps of:

preparing a solution of metal alkoxide, in which metal represents one selected from the group consisting of zirconium, titanium, cerium, uranium, tin, vanadium, antimony and calcium, in organic solvent; and hydrolyzing the solution, to obtain the proton-conductive inorganic nanoparticle or precursor therefor.

An alkoxide of the metal alkoxide represents a linear or branched alkyl group, having preferably 1 to 24 carbons, more preferably 1 to 10 carbons. Examples of the alkyl group may include a methyl group, an ethyl group, a propyl group, a butyl group, an i-propyl group, an i-butyl group, a pentyl group, a hexyl group, an octyl group, a 2-ethylhexyl group, a t-octyl group, a decyl group, a dodecyl group, a tetradecyl group, a 2-hexyldecyl group, a hexadecyl group, an octadecyl group, a cyclohexylmethyl group, an octylcyclohexyl group and the like.

The organic solvent used for the sol-gel reaction is not particularly limited as long as it dissolves a metal alkoxide. Preferable examples of the organic solvent may include carbonate compounds (for example, ethylene carbonate and propylene carbonate), heterocyclic compounds (for example, 3-methyl-2-oxazolidinone and N-methylpyrrolidone), cyclic ethers (for example, dioxane and tetrahydrofuran), linear ethers (for example, diethyl ether, ethylene glycol dialkyl ether, propylene glycol dialkyl ether, polyethylene glycol dialkyl ether, and polypropylene dialkyl ether), alcohols (for example, methanol, ethanol, isopropanol, ethylene glycol monoalkyl ether, propylene glycol monoalkyl ether, polyethylene glycol monoalkyl ether, and polypropylene glycol monoalkyl ether), polyhydric alcohols (for example, ethylene glycol, propylene glycol, polyethylene glycol, polypropylene glycol, and glycerol), nitrile compounds (for example, acetonitrile, glutarodinitrile, methoxyacetonitrile, propionitrile, and benzonitrile), esters (for example, carboxylic acid ester, phosphoric acid ester, and phosphonic acid ester), aprotonic polar substances (for example, dimethylsulfoxide, sulfolane, dimethylformamide, and dimethylacetamide), nonpolar solvents (for example, toluene and xylene), chlorine-based solvents (for example, methylene chloride and ethylene chloride), and water.

Among them, alcohols such as ethanol and isopropanol; nitrile compounds such as acetonitrile, glutarodinitrile, methoxyacetonitrile, propionitrile and benzonitrile; and cyclic ethers such as dioxane and tetrahydrofuran are preferable. They may be used alone or in combination of two or more of them.

In the sol-gel reaction, a chemical modifier may be used for chelating the metal atoms. Examples of the chemical modifier may include acetoacetic esters (for example, ethyl acetoacetate), 1,3-diketone (for example, acetylacetone), and acetoacetamides (for example, N,N-dimethylamino acetoacetamide).

The catalyst for the hydrolysis and dehydration polycondensation in the gel reaction may be an acid or alkali. The alkali is generally an alkali metal hydroxide such as sodium hydroxide, or ammonia. The acid catalyst may be an inorganic or organic protonic acid. Examples of the inorganic protonic acid may include hydrochloric acid, nitric acid, sulfuric acid, boric acid, perchloric acid, tetrafluoroboric acid, hexafluoroarsenic acid, and hydrobromic acid. Examples of the organic protonic acid may include acetic acid, oxalic acid, and methanesulfonic acid.

A complex oxide may be prepared by adding a solution containing, for example, one of the above-described metal nitrate, ammonium salt, chloride, or sulfate to a sol solution of a metal alkoxide, and then carrying out sol-gel reaction. Examples of the salt may include, but are not limited to, aluminum nitrate, iron nitrate, zirconium oxynitrate, titanium chloride, aluminum chloride, zirconium oxychloride, titanium sulfate, and aluminum sulfate. The solvent for the salt is not particularly limited as long as it dissolves the salt. Examples of the solvent may include carbonate compounds (for example, ethylene carbonate and propylene carbonate), heterocyclic compounds (for example, 3-methyl-2-oxazolidinone and N-methylpyrrolidone), cyclic ethers (for example, dioxane and tetrahydrofuran), linear ethers (for example, diethyl ether, ethylene glycol dialkyl ether, propylene glycol dialkyl ether, polyethylene glycol dialkyl ether, and polypropylene dialkyl ether), alcohols (for example, methanol, ethanol, isopropanol, ethylene glycol monoalkyl ether, propylene glycol monoalkyl ether, polyethylene glycol monoalkyl ether, and polypropylene glycol monoalkyl ether), polyhydric alcohols (for example, ethylene glycol, propylene glycol, polyethylene glycol, polypropylene glycol, and glycerin), nitrile compounds (for example, acetonitrile, glutarodinitrile, methoxyacetonitrile, propionitrile, and benzonitrile), esters (for example, carboxylic acid ester, phosphoric acid ester, and phosphonic acid ester), aprotonic polar substances (for example, dimethylsulfoxide, sulfolane, dimethylformamide, and dimethylacetamide), nonpolar solvents (for example, toluene and xylene), chlorine-based solvents (for example, methylene chloride and ethylene chloride), and water.

<A Hybrid Material (an Inorganic Mesoporous Material)>

The present invention provides a proton-conductive hybrid material comprising a proton-conductive inorganic mesoporous material and a proton-conductive polymer. A pore diameter of the proton-conductive inorganic mesoporous material may be 20 nm or less, preferably 10 nm or less, more preferably 5 nm or less, most preferably 2 nm or less. Preferably, the proton-conductive polymer may be located in the vicinity of a pore of the proton-conductive inorganic mesoporous material, and more preferably, the proton-conductive polymer may be surrounded by the proton-conductive inorganic mesoporous material.

Furthermore, the above-described proton-conductive polymer may be used for the proton-conductive polymer.

The proton-conductive polymer may be chemically bound to the proton-conductive inorganic mesoporous material.

The proton-conductive hybrid material may have a proton conductivity of $10^{-3}$ S/cm to 1 S/cm at temperature of −20 to 150° C. under low and high humidity conditions.

The proton-conductive inorganic mesoporous material may be at least one selected from the group consisting of mesoporous zirconium compounds, mesoporous titanium compounds, mesoporous cerium compounds, mesoporous uranium compounds, mesoporous tin compounds, mesoporous vanadium compounds, mesoporous antimony compounds, and mesoporous calcium hydroxyapatite and mesoporous hydrated calcium hydroxyapatites, preferably mesoporous zirconium compounds. In particular, mesoporous compounds may have a functional group. Examples of the functional group may include, but are not limited to, —$SO_3H$, —$PO_4$, and the like.

The mesoporous zirconium compound may be at least one selected from the group consisting of mesoporous $ZrO_2$, mesoporous $ZrO_2.nH_2O$, mesoporous $Zr(HPO_4)_2$, mesoporous $Zr(HPO_4)_2.nH_2O$, mesoporous $Zr(HSO_3)_2$, mesoporous $Zr(HSO_3)_2.nH_2O$, mesoporous $Zr(O_3P-R^1-SO_3H)_2$, mesoporous $Zr(O_3P-R^1-SO_3H)_2.nH_2O$, mesoporous $Zr(O_3P-R^2-SO_3H)_{2-x}(O_3P-R^3-COOH)_x$, and mesoporous $Zr(O_3P-R^2-SO_3H)_{2-x}(O_3P-R^3-COOH)_x.nH_2O$, wherein $R^1$, $R^2$, and $R^3$ each independently represents a bivalent group, preferably $R^1$ and $R^2$ each independently represents a bivalent aromatic group, and $R^3$ represents an alkylene group. In particular, mesoporous zirconium compounds may have a functional group. Examples of the functional group may include, but are not limited to, —$SO_3H$, —$PO_4$, and the like.

The titanium compound may be at least one selected from the group consisting of mesoporous $TiO_2$, mesoporous $TiO_2.nH_2O$, mesoporous $Ti(HPO_4)_2$, mesoporous $Ti(HPO_4)_2.nH_2O$, mesoporous $Ti(HSO_3)_2$ and mesoporous $Ti(HSO_3)_2.nH_2O$.

The cerium compound may be at least one selected from the group consisting of mesoporous $CeO_2$, mesoporous $CeO_2.nH_2O$, mesoporous $Ce(HPO_4)_2$ and mesoporous $Ce(HPO_4)_2.nH_2O$.

The uranium compound may be at least one selected from the group consisting of mesoporous $H_3OUO_4PO_4$, mesoporous $H_3OUO_4PO_4.nH_2O$, mesoporous $H_3OUO_2AsO_4$ and mesoporous $H_3OUO_2AsO_4.nH_2O$.

The tin compound may be mesoporous $SnO_2$ or mesoporous $SnO_2 \cdot nH_2O$.

The vanadium compound may be mesoporous $V_2O_5$ or mesoporous $V_2O_5 \cdot nH_2O$.

The antimony compound may be at least one selected from the group consisting of mesoporous $Sb_2O_5$, mesoporous $Sb_2O_5 \cdot nH_2O$, mesoporous $HSbO_3$, mesoporous $HSbO_3 \cdot nH_2O$, mesoporous $H_2SbO_{11}$, mesoporous $H_2SbO_{11} \cdot nH_2O$, mesoporous $H_xSb_xP_2O_3$ and mesoporous $H_xSb_xP_2O_3 \cdot nH_2O$, wherein x represents 1, 3 or 5 and n is 2-10.

The calcium hydroxyapatite and hydrated calcium hydroxyapatites may be at least one selected from the group consisting of mesoporous $Ca_{10}(PO_4)X_2$ and mesoporous $Ca_{10}(PO_4)X_2 \cdot nH_2O$, wherein X represents —OH and/or —F.

In particular, each of the above-described mesoporous compounds may have a functional group. Examples of the functional group may include, but are not limited to, —$SO_3H$, —$PO_4$, and the like.

The proton-conductive inorganic mesoporous material may have a proton conductivity of the order of $1 \times 10^{-5}$ S/cm, preferably of the order of $1 \times 10^{-3}$ S/cm, more preferably of the order of $1 \times 10^{-2}$ S/cm at temperature of 20-150° C.

<A Fuel Cell or the Like Including the Above-Described Material>

The proton-conductive hybrid material according to the present invention may be used for a fuel cell, in particular, a catalyst layer used for a fuel cell, and an electrolyte membrane used for a fuel cell. Therefore, the present invention can provide a fuel cell comprising the proton-conductive hybrid material according to the present invention, in particular, a catalyst layer used for a fuel cell, and/or an electrolyte membrane used for a fuel cell, each of which comprises the proton-conductive hybrid material according to the present invention.

EXAMPLES

The present invention will be illustrated by way of the following Examples, but is not limited thereto.

A novel membrane concept of pore filling membrane having superior properties compared to Nafion® have been demonstrated. The pore filling membrane consists of a porous polymer substrate and a filling polymer electrolyte, which fills the pores of the substrate. However, in addition to its excellent properties, the problem associated with seems to be the water retention at higher temperatures. Inorganic particles are known to retain water even at higher temperatures, and therefore the above problem can be solved by employing a polymer along with inorganic particles homogeneously embedded in the polymeric matrix. The homogeneous distribution depends on the size, nature and surface structure of the inorganic particles. Considering the inorganic particle, silica is the most widely studied system. Since the tailoring of the silica particle using the silicon alkoxide is easier. On the other hand, Zirconia based systems seem to be more ideal, since it's a hard material as well as it can withstand harsh chemical environments. Sulfonated hydrocarbon based polymer such as Sulfonated Polyether Sulfone (S-PES) seems to be attractive as a proton conductor especially because of its low cost, commercial availability, thermal and chemical stability, and also reasonable proton conductivity when its properly humidified.

The Research Work: (at a Glance)
The Concept:
1. Synthesis of fully re-dispersible zirconia nanoparticles in polar organic solvents by controlling the hydrolysis and condensation of zirconia alkoxide in presence of a surface modifier.
2. Synthesis of Sulfonated polyether sulfone.
3. Nanohybrid synthesis—homogeneous distribution of inorganic nanoparticle in the polymer matrix.
4. In situ synthesis of phosphated zirconia in the polymer matrix.
5. Proton conductivity of hybrid electrolytes.
6. Fabrication of Pore Filling Membranes—by impregnation of the nanohybrid electrolyte into the pores of the porous polymer substrate.
7. Proton conductivity and Fuel Cell testing.

A schematic representation of the Concept for the pore filling electrolyte membrane is represented in FIG. 2 as below:

Advantages of Nanohybrid Pore Filled Membranes.
1. Higher conductivity at elevated temperatures (20-120° C.) and low humidity conditions (~50% Relative humidity).
2. High Mechanical and Chemical stability.
3. Fuel cross over is controlled.
4. Polymer swelling is suppressed due to the nanosized inorganic and the pore walls of the membrane.

Proton Conduction at Low as Well as High Temperature:
Nanohybrid Consisting of $Zr(HPO)_4 \cdot nH_2O$ and SPES:
1. At low temperature and high humidity conditions, the proton conduction is due to a combined effect of the so called "Vehicle mechanism" (where the solvent water acts as vehicle for the proton transport) and "Grotthuss" mechanism (proton transfer due to the presence of hydrogen bonding).

The different types of water associated with the polymer system are represented in FIG. 4.

2. At high temperatures, the free water associated with the system evaporates, however, the inorganic can retain water, for example, material such as layered zirconium phosphate possesses interlayer water, and require very high temperature (~300-400° C.) to remove.
3. At high temperatures, the proton conductivity is dominated by the presence of water associated with the zirconium hydrogen phosphate, which are linked through hydrogen bonding with P—OH groups of ZrP. "Grotthuss" mechanism predominates for proton conductivity.

The chemical structure of zirconium hydrogen phosphate is represented in FIG. 5.

<Synthesis of Re-Dispersible Nanozirconia Precursor Powder>

One of the major and important criteria in the synthesis of inorganic-organic hybrid is the dispersion characteristics of the inorganic oxide/hydroxide in the polar organic solvents. Highly re-dispersible nanozirconia precursor powder is prepared by controlling the hydrolysis and condensation of zirconium alkoxide in presence of a surface modifier such as acetyl acetone. The amount of water and drying temperature decide the dispersion properties. The synthesized powder showed high level dispersion in polar organic solvents. The dynamic light scattering analysis was carried out using Zetasizer NanoZS (Malvern Instruments, UK) of the powder in organic solvent 1-methylpyrrolidone (NMP) and after mixing with the polymer solution is shown in FIG. 6.

Highly redispersible nanozirconia precursor powder in polar organic solvent was synthesized through surface modification.

<Nanohybrid Synthesis>

In-situ generation of Zirconium hydrogen phosphate (ZrP) in SPES polymer matrix was carried out by blending the inorganic and polymer solutions followed by film casting. The film was further treated with phosphoric acid to convert the homogeneously distributed $Zr^+$ into ZrP. The films were treated in boiling water to remove any excess of acid present. The as made films were transparent indicating the high homogeneity of the nanoparticle inclusions in the polymeric matrix. Considering the zirconium hydrogen phosphate, the advantages include as follow:

Higher conductivity than solids such as $SiO_2$, $TiO_2$ and zeolites.

Not soluble in acids, alcohols.

No leaching out from the membrane.

Thermal and chemical stability.

Higher conductivity at higher temperature when inside the membrane.

In addition to this, the $Zr(HPO_4)_2 \cdot nH_2O$ can interact with the sulfonic acid groups of SPES and dissociates protons. It may also bridge proton exchange sites of SPES, thereby shortening the distance of proton hopping.

The FIG. 7 shows the proton conductivity values of the hybrid electrolyte at 90° C. under various humidity conditions. High Conductivity values of the order of $10^{-1}$ was achieved in Zr/ZrP-SPES system at 90° C.

Example 1

1. Sol-Gel Synthesis of Re-Dispersible Zirconia Precursor Powder

Zirconia sol was prepared from zirconium alkoxide (Zirconium butoxide): A dilute solution (0.05M) of zirconium alkoxide was first made in isopropyl alcohol. During the sol preparation, a surface modifier (such as Acetyl acetone) was added dropwise to the zirconium alkoxide solution under stirring, and continued stirring for 2 hrs. The metal (M) to surface modifier (L) ratio was 1:2. 1M nitric acid solution was used as the hydrolyzing catalyst, and added to the above system under vigorous stirring, to obtain a clear, transparent, stable zirconia sol. This was further stirred for overnight. Zirconia gel was obtained by evaporating the solvent at 90° C., and was further dried at 90/100° C. for one day in an air oven. The dried powder was tested for its dispersion characteristics in organic solvents used for the polymer. The dynamic light scattering experiments for stokes particle size determination were carried out using the dynamic light scattering instrument (MELVERN, Nano-2004, UK).

2. Synthesis of Proton Conducting Hybrid Electrolyte

Syntheses of proton conducting hybrid electrolytes were prepared by incorporating the above inorganic nanoparticles into the sulfonated polyether sulfone (SPES). A 20 wt % solution of the S-PES was made by dissolving the appropriate quantity of the polymer in an organic polar solvent (N-methylpyrrolidone (NMP)). A 30 wt % solution of the zirconia powder was prepared by dissolving the required amount of the powder in the organic polar solvent (NMP). Various amounts of zirconia containing solutions in polar organic solvent were further blended with the SPES solution in order to get various weight percentage zirconia incorporated SPES hybrid electrolytes. Self standing hybrid electrolyte films (Zr-SPES) were made by casting method without porous substrate at 120° C., followed by vacuum drying at 80° C. for overnight.

The Zr-SPES hybrid films obtained were further treated with a dilute solution (2 M) of phosphoric acid at 80° C. for 6 hrs, in order to convert the homogeneously distributed zirconia nanoparticle in the SPES polymer matrix into zirconium hydrogen phosphate (ZrP-SPES). After phosphoric acid treatment, the ZrP-SPES film obtained was treated in boiling water in order to remove any excess of phosphoric acid present in the hybrid. The proton conductivities of the hybrid films were measured using impedance method.

FIG. 6 represents the dynamic light scattering (DLS) graph of zirconia precursor powder re-dispersed in solvent NMP and SPES/NMP. After re-dispersion, stokes diameter of the particles indicated as less than 2 nm, similar to that of its parent sol, showing the high dispersible nature of the precursor powder. After mixing with the polymer solution, it showed the diameter in the range 2-3.5 nm, the slight increase may be due to the very fine agglomeration of the particles in the polymer matrix. The proton conducting values of the hybrid films under various relative humidity (RH) conditions (30%-90% RH) were measured using impedance method at 90° C. (see FIG. 7) and 55° C. (see FIG. 8).

There is considerable increase in the conductivity after inorganic modification and also with respect to the increaser in amount of inorganic, compared to pure SPES. The proton conductivity is promoted by the dissociation of protons from hydroxyl bonds and the proton hopping between the hydroxyl groups and water molecules. As the inorganic content increases, the number of hydroxyl groups increases, since it can retain water even at higher temperatures finally resulting a higher conductivity. The proton conductivity values of zirconium hydrogen phosphate incorporated S-PES showed higher conductivity compared to its counter part. The ionogenic —P OH of the surface were easier to be hydrated rather than the inner one, thus resulting an enhanced dissociation and water protonation. The proton dissociation energy is primarily determined by the hydrogen bonding strength of the hydroxyl bonds. The cations bound to hydroxyl with strong hydrogen bonding are favorable to increase the conductivity. Phosphorus ions were one candidate for the strong H— bonding ions. The hydrogen in P—OH is more strongly hydrogen bonded with water molecules, resulting in an increase in the temperature necessary to remove the water from P—OH. Further, the $Zr(HPO_4)_2$ can interact with the sulfonic acid groups of SPES and dissociates protons, it may also can bridge proton exchange sites of SPES, thereby shortening the distance of proton hopping, resulting an enhanced conductivity as reported in the case of Nafion® modified with ZrP.

<ZrP-SPES Nanohybrid-Proton Conduction>

It is reasonable to except an increase in conductivity with rise in temperature. The presence of inorganic material increases both water uptake and water retention at high temperatures. The ratio of free water to bond water is high in SPES compared to the one containing the inorganic. At higher temperature, the proton conduction is due to the presence of bond water associated with the inorganic. However, considering the two proton conducting mechanisms, it can be suggested that in such systems, at low temperatures, the vehicle mechanism is predominated due to the existence of free water. On the other hand, at higher temperatures, the proton conduction is mainly through Grotthhus mechanism.

Example 2

Experiments

<Control of Hybrid Particle Size>

A nano-sized particle has a high surface energy, and it can form agglomerate easily with near particle. It is important that high surface area and particle to particle distance for a proton conductivity network in inorganic solid proton conductors materials. There are necessary to stabilization of particle surface. For this purpose, SPES ionomer is used as a capping agent to nano-hydrated zirconia. They attract each other because of an absorption and/or coordination force as shown in FIG. 10. And the strength of nano-hydrated zirconia and SPES is enhanced by using a reduction agent like alcohol. Because of alcohol is a poor solvent for SPES. The procedure of particle size control is as follows:

Materials:
 Hydrated zirconia;
 SPES ion-exchanged resin;
 DMF (dimethylformamide);
 Alcohol.

Procedure:
 1. Weigh out 0.1375 g of 10 wt % hydrated zirconia solution dissolved in DMF in a vial container with a stirring bar.
 2. Stir the solution with a magnetic stirrer.
 3. Add 0.1375 g of 5 wt % SPES solution dissolved in DMF slowly.
 4. Stir the solution with a magnetic stirrer for 2 h at sealed-up state.
 5. Add 0.15 g of the mixed solution (0.05 g of DMF and 0.1 g of alcohol) slowly.
 6. Stir the solution with a magnetic stirrer for 30 min at open state.
 7. Stir the solution with a magnetic stirrer for 6 h at sealed-up state.

The change of a particle size distribution was detected by DLS (dynamic light scattering).

<Fabrication of Catalyst Layer>

Materials:
 Teflonized carbon paper (EC-TP1-060T);
 Carbon supported platinum: 46.5 wt. % Pt/Ketjenblack (TEC10E50E);
 SPES50 ion-exchanged resin;
 PTFE dispersions: 60 wt. % dispersed in water.

Procedure:
 1. Weigh out 0.375 g of hybrid ionomer controlled of particle size in a vial container with a stirring bar.
 2. Add 0.066 g of carbon supported platinum.
 3. Add 0.0068 g of SPES.
 4. Stir the paste with a magnetic stirrer and ultrasonic wave alternately to vaporize the solvent until it has a proper viscosity.
 5. Add 0.0275 g of PTFE dispersions using a Pasteur pipette and stir for 1 min.
 6. Coat the paste on a diffusion layer by screen-print.

<Structural Analysis of Electrodes>

Mercury Porosimetry—Primary Pore Distribution:

The mercury porosimetry technique is one of the most useful methods to investigate the porous structure of solid samples in a quantitative way.

Bubble Point Test—Secondary Pore Distribution:

The result of bubble point test shows the secondary pore structure of the electrode.

<Determination of Platinum Surface Area by Cyclic Voltammetry>

In cyclic voltammetry, the measured current is due to hydrogen adsorption and desorption on/from vacant Pt sites. Electric charges by hydrogen adsorption/desorption $Q_H$ [α] can be obtained by cyclic voltammograms. Total Pt surface area $S_{Pt}$ can be estimated by following equations:

$$S_{Pt} = \frac{Q_H}{2.1} \times 10^4 [cm^2]$$

Assuming that the atomic density of Pt surface is $1.31 \times 10^{15}$ [/cm$^2$], $Q_H$ can be determined as the value of the cyclic voltammogram area.

<Results and Discussion>

<Distribution of Hybrid Particle Size>

Each of FIGS. 11 and 12 represents an each pore size distribution by DLS. In FIG. 11, the particle size of hydrated zirconia is almost 1.2 nm at the peak position and the particle size distribution of nano-hydrated zirconia changed to a broad shape by water. It means that nano-hydrated zirconia forms an agglomerate and in unstable state. The size distribution peak of SPES shift the left direction by incorporated with nano-hydrated zirconia and indicate a smaller size by adding a reduction agent in FIG. 12.

<Structural Analysis of Electrodes>

Each of FIGS. 13 and 14 shows a pore size distribution by a mercury porosimetry and bubble point test, respectively. In FIG. 13, the primary pore size peak of the hybrid electrode composed of SPES 3 and hydrated zirconia is located more left side than an SPES 3 electrode. It means that the hybrid ionomer can intrude a primary pore easily than SPES 3 ionomer because of a smaller hybrid ionomer size. In FIG. 14, the secondary pore distribution of each electrode is located almost the same region from 0.3 μm to 0.5 μm.

<Catalyst Utilization by Cyclic Voltammetry>

FIGS. 15 and 16 are the results of cyclic voltammetry. In FIG. 15, the utilization of SPES electrode is the area surrounded by dotted base line and black peak line. So, the catalyst utilization of the hybrid electrode is bigger than the SPES electrode. And the catalyst utilization of the modified hybrid electrode is the biggest as shown FIGS. 15 and 16.

SUMMARY

In the hybrid ionomer by a nano-hydrated zirconia incorporated by SPES, we can get two effects. One is the stabilization of nano-particle's surface. And the other is the size change of SPES from the size like a radius of gyration in proportion to its molecular weight to the smaller size according to a base matrix like nano-hydrated zirconia in this case. All of smaller size ionomer is related to the pore structure like a primary pore in an electrode. By extension, the nano-sized hybrid particle capped with a high molecular weight polymer can intrude easily a primary pore depending on hybrid particle size and they can cover the inner surface area of the primary pore in catalyst layer. And the utilization of catalyst can be increased.

Example 3

1.1 Control of Moisture Content in Hybrid Particles

Hybrid electrolyte particles are subjected to reduction treatment (alcohol treatment) for controlling the particle diameter, and then subjected to fuel cell test at a high temperature. In the measurement of cyclic voltammogram (CV), it was confirmed that the reduced hybrid particles easily penetrated into primary pores to improve the catalyst utilization. However, in the I-V measurement, the variation in the fuel cell performance at high temperatures was not confirmed. Then, the treatment shown in FIG. 17 was conducted to improve water retentivity which is important for proton conductivity.

<Experiment Procedure>

Hydrated zirconia was dissolved in a polar solvent (DMF).

SPES is dispersed in the zirconia solution, and then mixed with a solution containing water and an alcohol at predetermined ratios.

The mixed solution was stirred for one day.

The particle diameter distribution of the mixed solution was measured by DLS.

Thereafter, a pore filling membrane and an electrode were made using the hybrid particles. The assembly of the hybrid membrane and the electrode (MEA: Membrane Electrode Assembly) was subjected to fuel cell test.

1.2 Fuel Cell Performance Evaluation on Hybrid MEA Using Zirconia Phosphate

When hydrated zirconia is treated with phosphoric acid, it readily turns into zirconia phosphate having a layer structure. ZrP is known to show high proton conductivity. Then, a pore filling membrane and an electrode were made using the hybrid particles prepared in Experiment 1.1, and then treated with phosphoric acid.

Experiment Procedure:

Pore Filling Membrane:

The pore filling membrane made as described above was immersed in water to be sufficiently swelled.

The resulting membrane was immersed in 2 M phosphoric acid at 80° C. for 6 hours.

Thereafter, the membrane was immersed in pure water to remove excess phosphoric acid.

Electrode:

The electrode made as described above was immersed in 2 M phosphoric acid at 80° C. for 6 hours.

Thereafter, the electrode was immersed in pure water to remove excess phosphoric acid.

Then, the electrode was dried with a vacuum dryer.

Subsequently, a hybrid MEA was made by hot pressing, and subjected to fuel cell test.

Result and Discussion

2.1 Moisture Content Control of Hybrid Particles

FIG. 18 shows the result of DLS. The hybrid particles subjected to the moisture content control exhibited a peak at about 3.2 nm, and the hybrid particles subjected to the reduction treatment alone exhibited a peak at about 2.8 nm. The particles subjected to the moisture content treatment have a larger particle diameter, which indicates that water had been introduced into the particles.

FIG. 19 shows the result of cyclic voltammetry, which indicates that the catalyst utilization of the hybrid electrode is higher than that of the SPES electrode. This is due to that the nanosized hybrid particles have a smaller particle diameter and thus easily penetrate into the primary pores.

FIG. 20 shows a hybrid pore filling membrane. The top picture of FIG. 20 shows a PI substrate (membrane thickness: 30 μm, UPILEX-PT), wherein the letters of "Substrate" written below the substrate cannot be seen. The bottom picture indicates that the substrate has become transparent by the hybrid particles filling the pores.

FIG. 21 shows the fuel cell performance of the MEAs at 100° C., and indicates that the hybrid MEA composed of the hybrid particles having an increased moisture content has higher IV property than other MEAs. This is due to that the introduced water forms hydrogen bonds with the OH groups on the surface of the zirconia particles or sulfonic acid groups of SPES to increase the overall water retentivity, which allows for the maintenance of proton-conductive pathways at high temperatures.

FIG. 21 shows the IV property of a hybrid MEA (Membrane Electrode Assembly) composed of an electrode and a pore filling membrane filled with hybrid particles composed of hydrated zirconia capped with SPES, a hybrid MEA composed of an electrode and a pore filling membrane filled with zirconia phosphate obtained through phosphorylation, and a SPES MEA composed of an Nafion 112 membrane and an SPES electrode, and the IV property of the IR loss free excluding the IR loss of the membrane. At high temperatures (100° C.), the moisture content necessary for proton conductivity between the membrane and the electrode decreases, so that the power generation performance deteriorates. The hybrid particles having an increased moisture content shows their effect at high temperatures. Therefore, the hybrid MEA (hydrated zirconia and zirconia phosphate) showed higher performance than the MEA composed of Nafion 112 and SPES electrode. Among the hybrid MEAs, the MEA composed of ZrP showed higher performance than that composed of hydrated zirconia. This is probably due to the high proton conductivity of the layer structure of ZrP. With an open electromotive force, the IV property of the pore filling membrane was higher than that of the Nafion 112 membrane. This is probably due to that the pore filling membrane is hard to be swelled, so that it is less prone to cause fuel cross over than the Nafion membrane.

Figure 1:
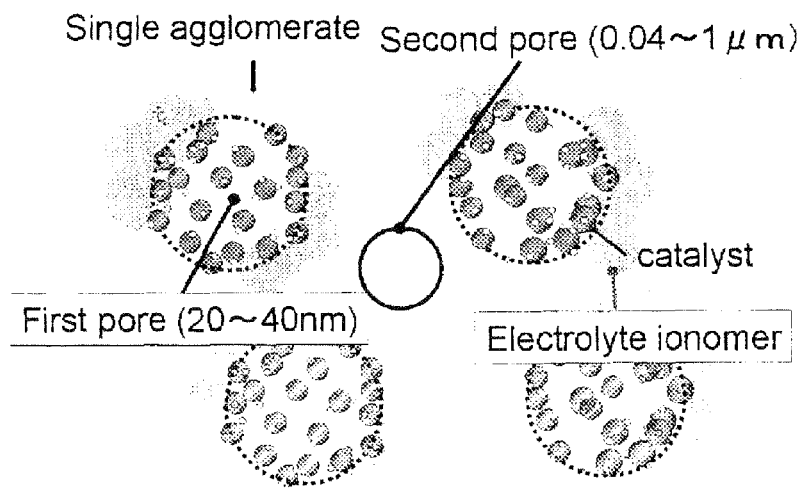
FIG. 1 is a schematic diagram of a catalyst layer composed of carbon as the electron transfer pathway, an ionomer as the gas or proton transfer pathway, and a platinum catalyst as the electric power generation site. (The layer has a complicated structure composed of primary (1st) pores (20 nm to 40 nm) and secondary (2nd) pores (40 nm) of agglomerate size.)
Figure 2:
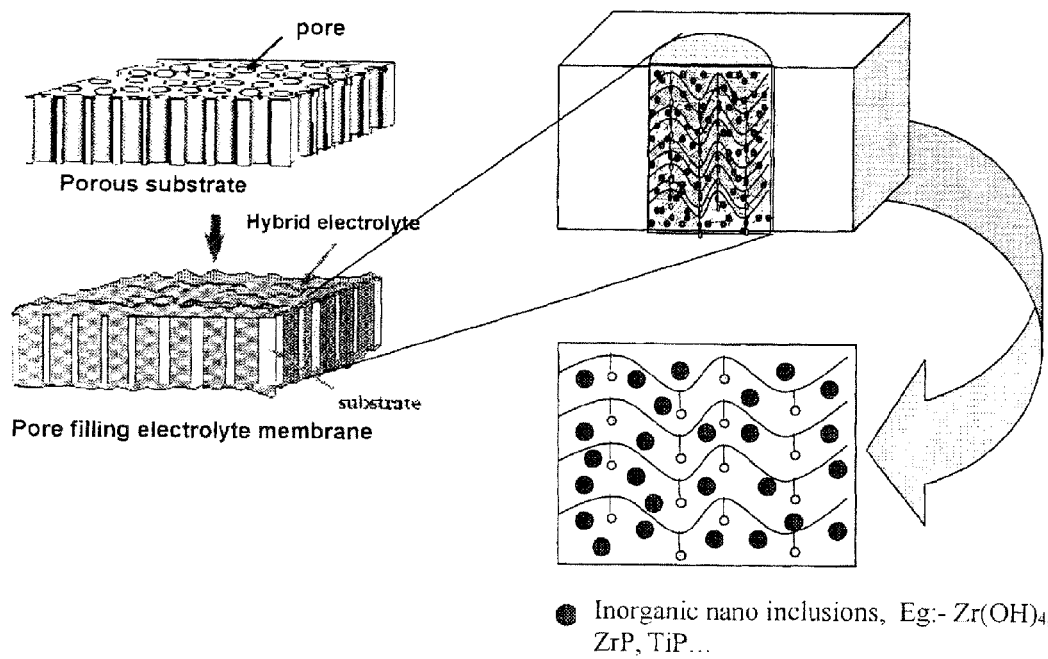
FIG. 2 is a schematic diagram of a pore filling electrolyte membrane.
Figure 3:
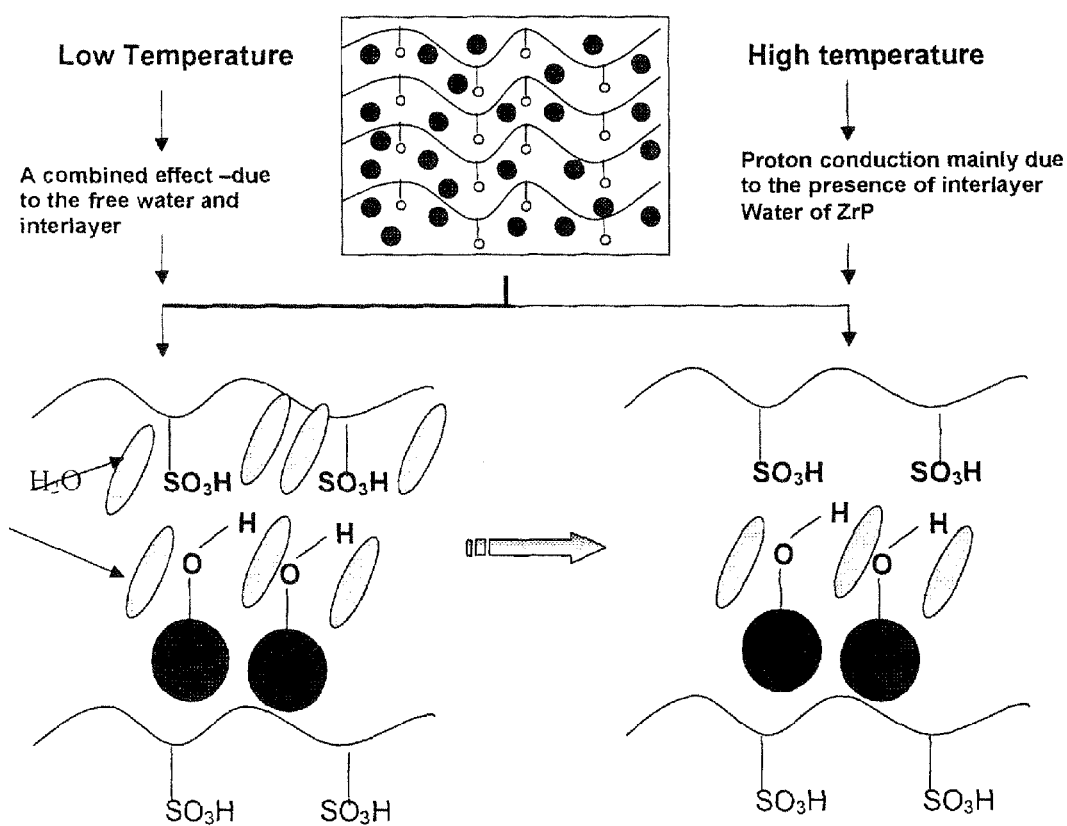
FIG. 3 shows the mechanism of proton conductivity by a nanohybrid composed of $Zr(HPO_4)_2 \cdot nH_2O$ and SPES. (Proton conductivities at low temperatures (the effects of free water and water between layers), and at high temperatures (the effect of water between ZrP layers))
Figure 4:
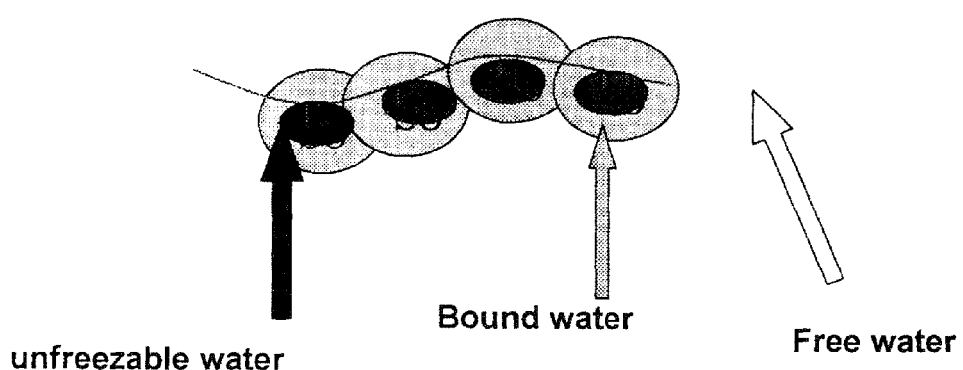
FIG. 4 is a schematic diagram of free water, bound water, and unfree water.
Figure 5:
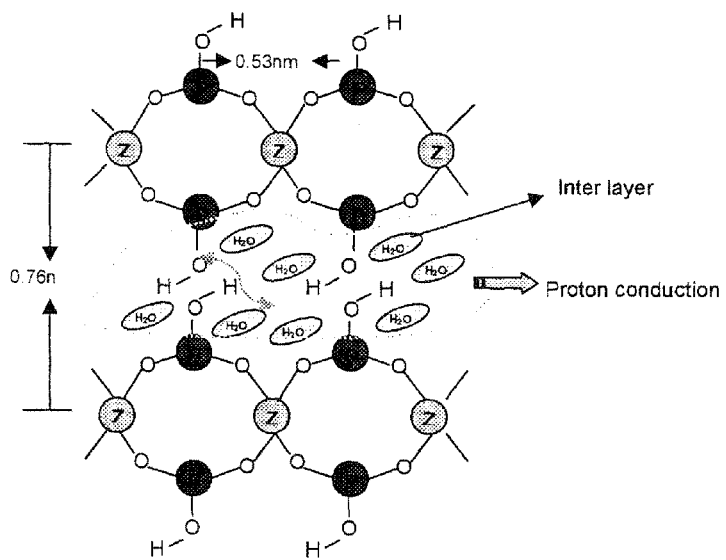
FIG. 5 shows the chemical structure of zirconium hydrogenphosphate.
Figure 6:
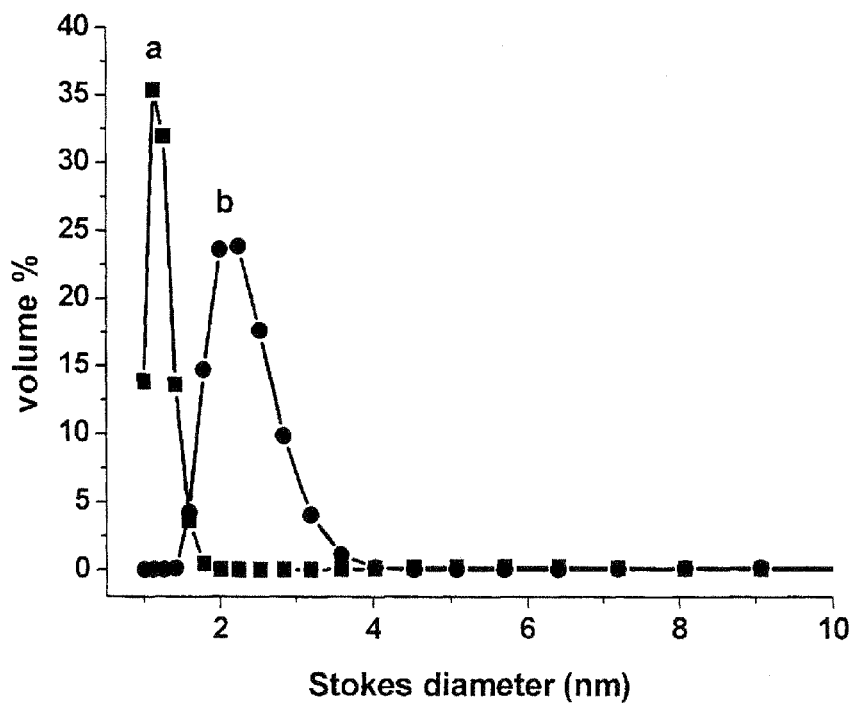
FIG. 6 is a graph showing the result of dynamic light scattering (DLS) analysis on: a) zirconia precursor powder in an NMP solvent; and b) zirconia precursor powder in SPES/NMP.
Figure 7:
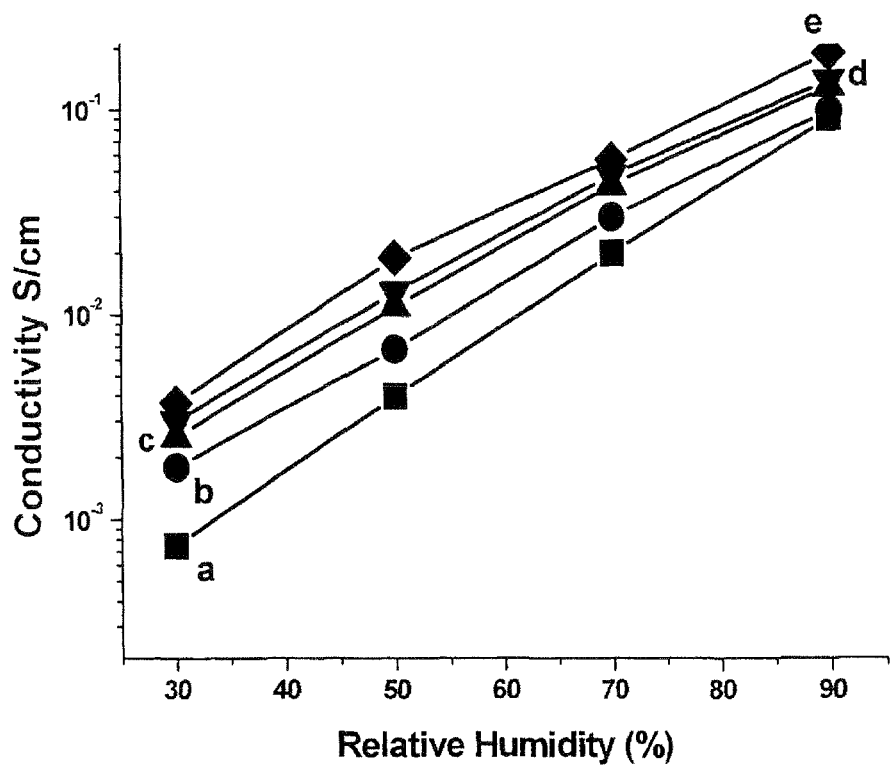
FIG. 7 is a graph of the conductivity of: a) SPES; b) Zr(10%)-SPES; c) Zr(30%)-SPES; d) Zr(50%)-SPES; and e) ZrP-SPES at 90° C.
Figure 8:
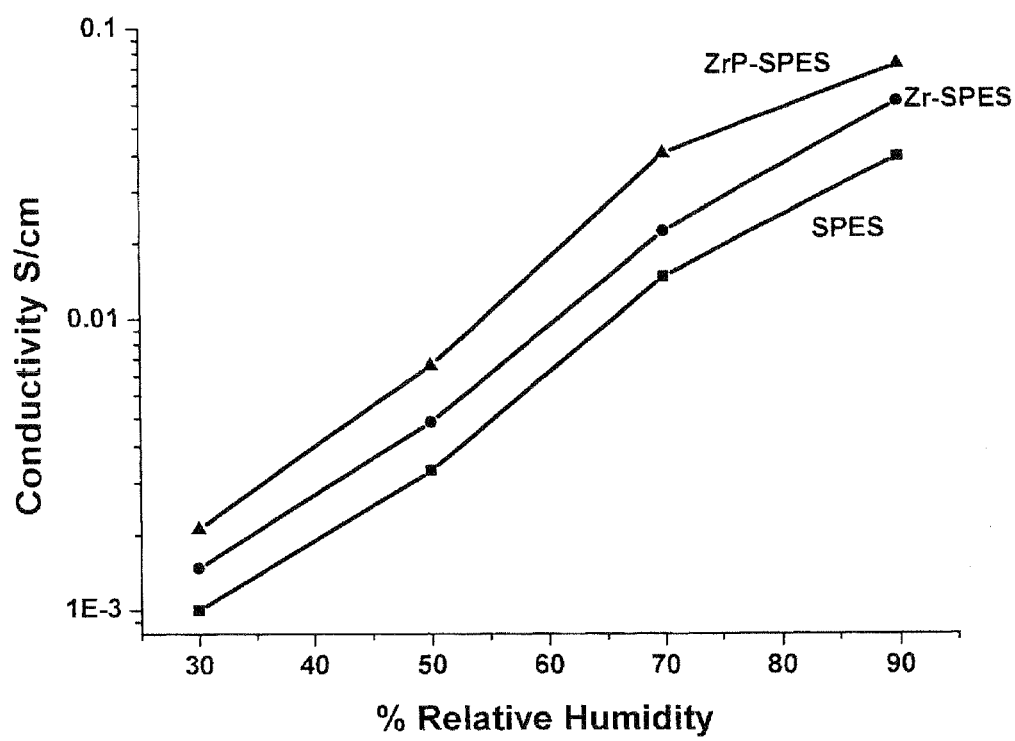
FIG. 8 is a graph of electrical conductivity of SPES, Zr-SPES, and ZrP-SPES at 55° C.
Figure 9:
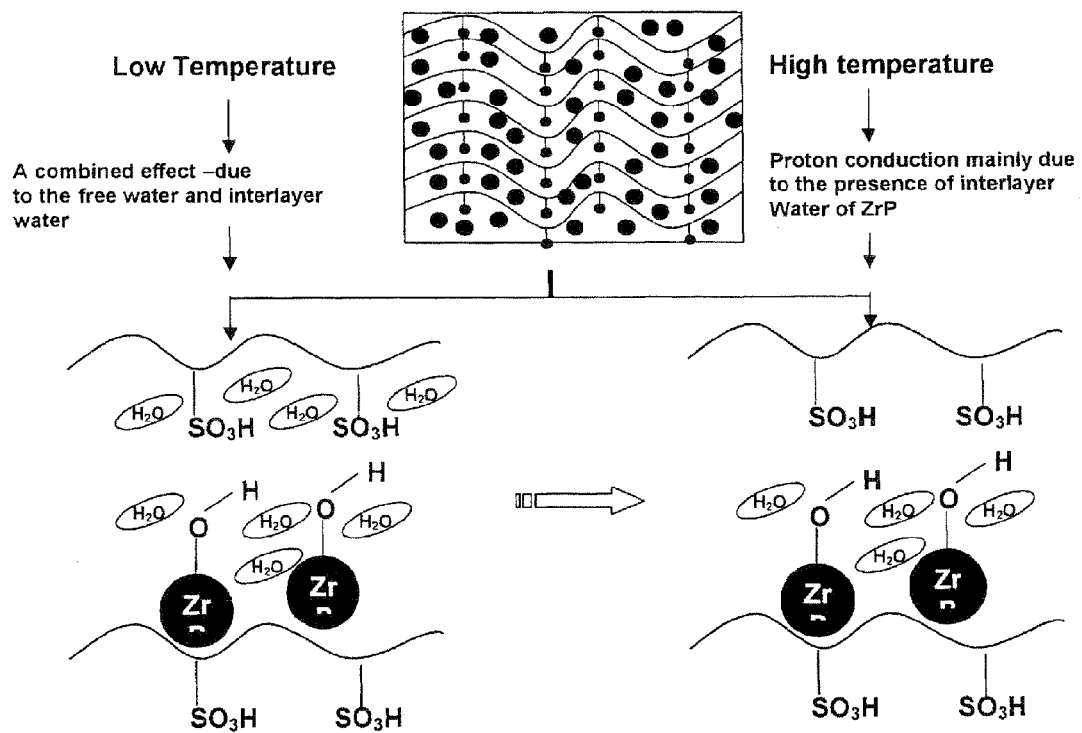
FIG. 9 is a schematic diagram of proton conductivity of the ZrP-SPES system at low temperatures (the effects of free water and water between layers), and at high temperatures (the effect of water between ZrP layers).
Figure 10:
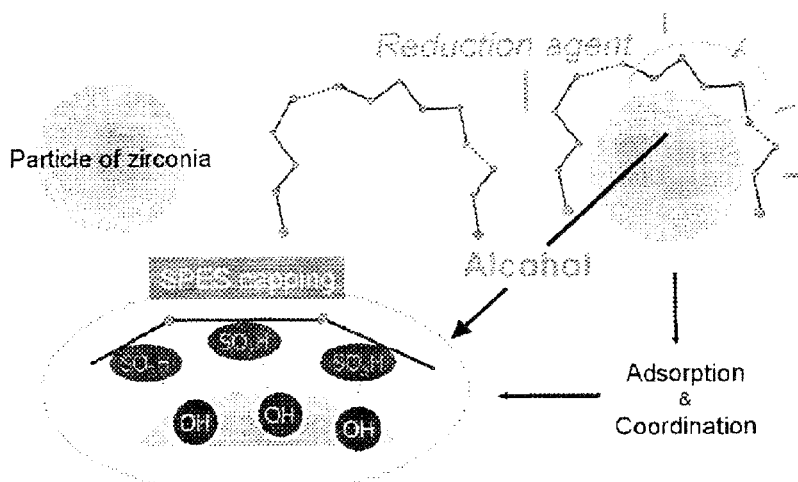
FIG. 10 shows inorganic nanoparticles capped with SPES (hybrid particles), and hybrid particles whose particle diameters are controlled by adding a reducing agent (alcohol).
Figure 11:
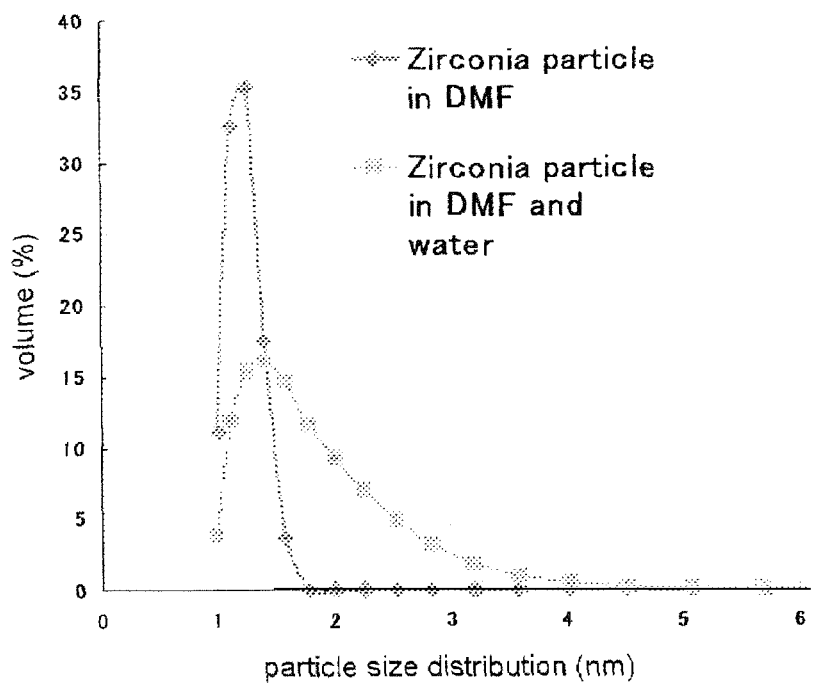
FIG. 11 shows the particle diameter distribution of zirconia particles in DMF and a mixture of DMF and water.
Figure 12:
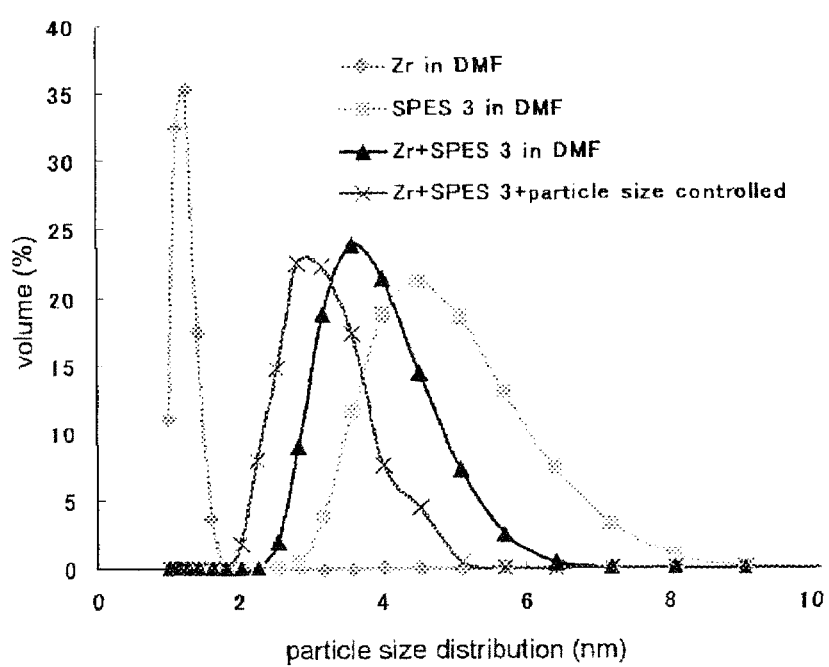
FIG. 12 shows the particle diameter distribution of Zr particles in DMF, SPES3 in DMF, Zr particles+SPES3 in DMF, and Zr particles+SPES3 after particle diameter control with a reducing agent (alcohol).
Figure 13:
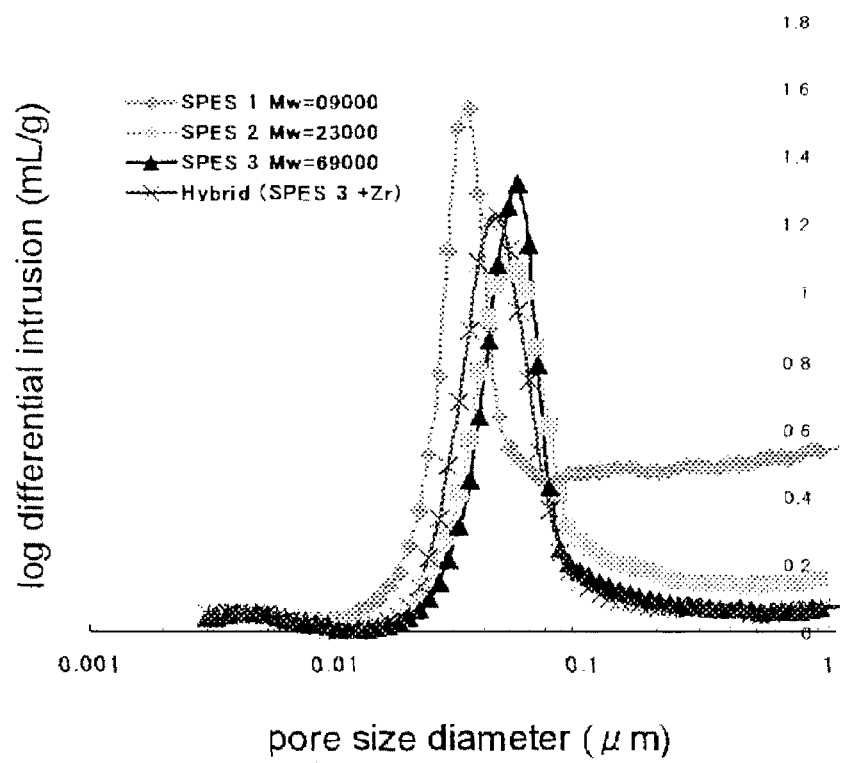
FIG. 13 shows the distribution of the primary pores in each electrode determined by mercury pore analysis.
Figure 14:
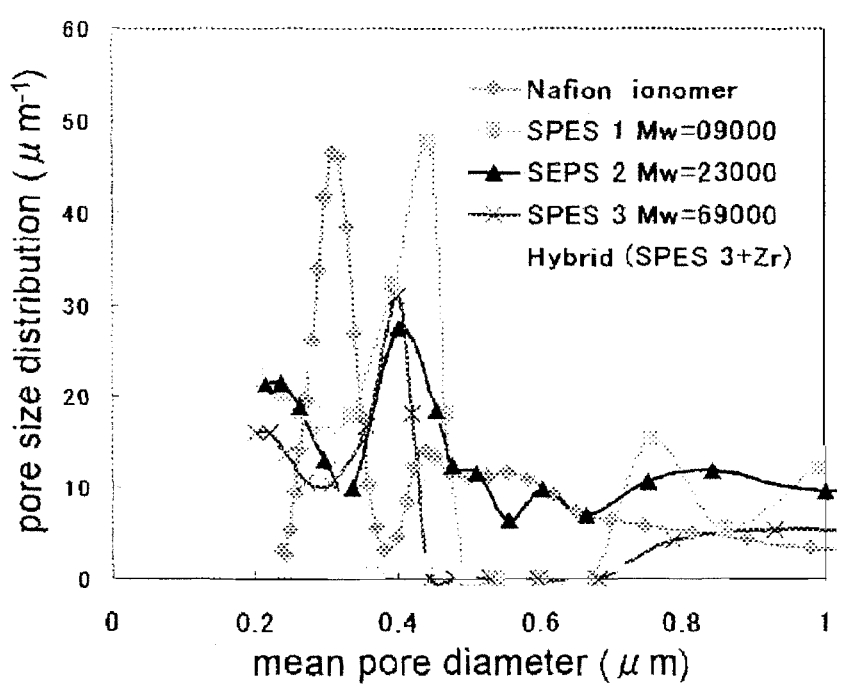
FIG. 14 shows the distribution of the secondary pores in each electrode determined by bubble point test.
Figure 15:
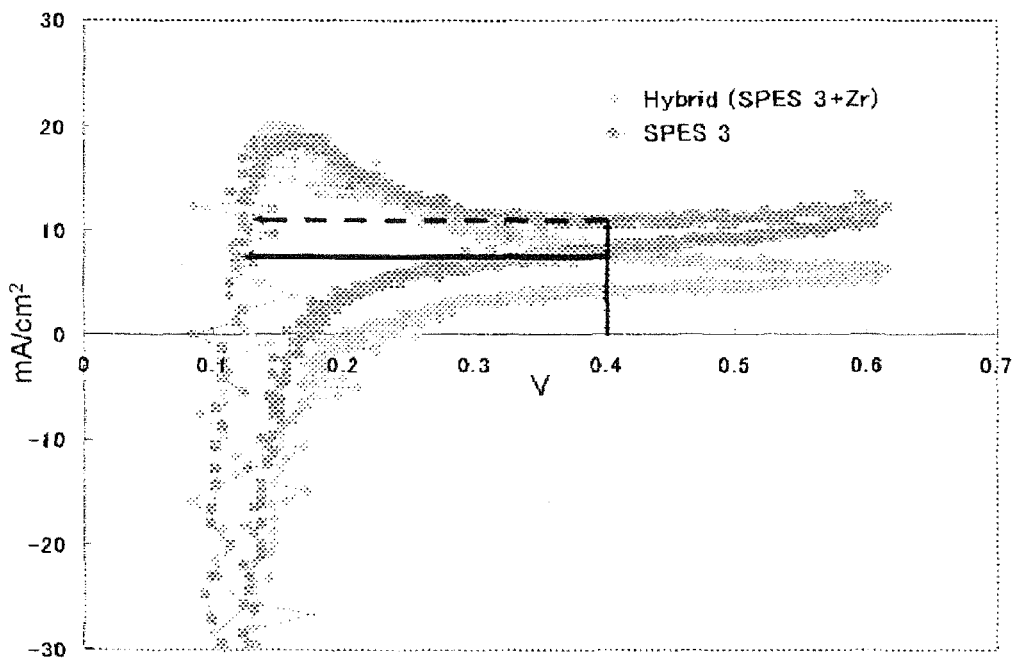
FIG. 15 shows the cyclic voltammograms of the hybrid electrode and SPES3 electrode.
Figure 16:
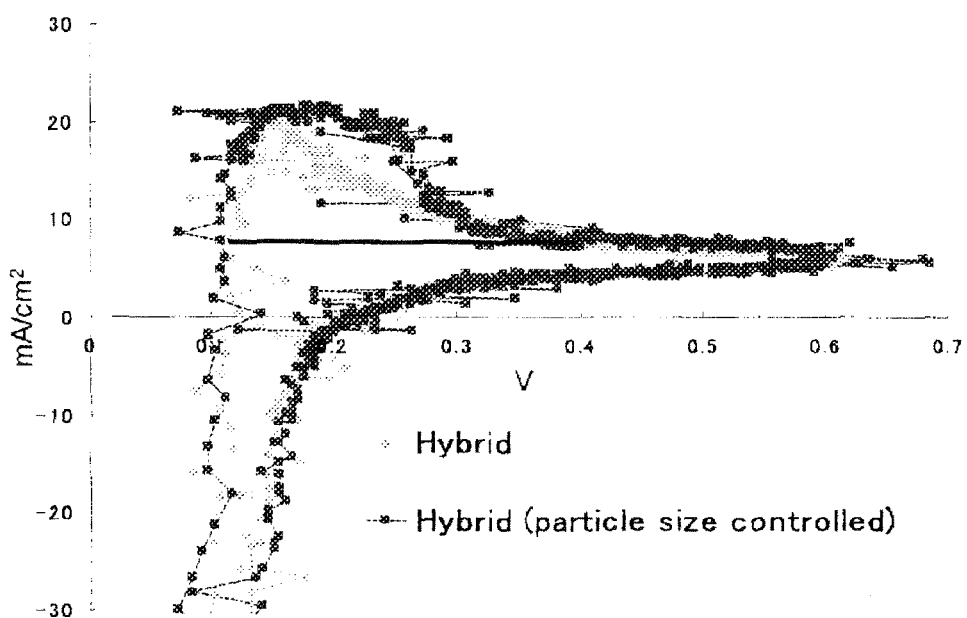
FIG. 16 shows the cyclic voltammograms of the hybrid and modified hybrid whose particle diameter has been controlled with a reducing agent (alcohol).
Figure 17:
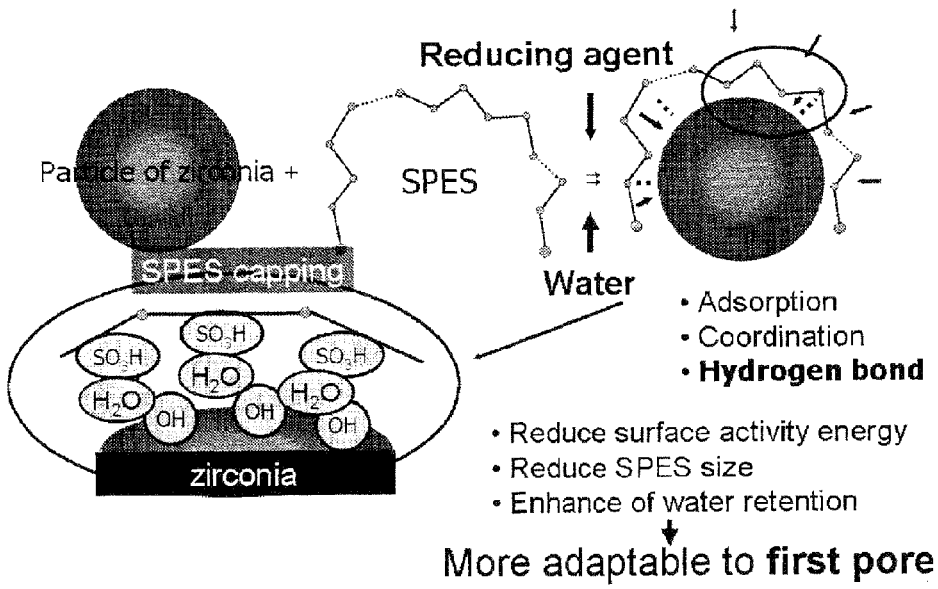
FIG. 17 is a schematic diagram of the hybrid particles.
Figure 18:
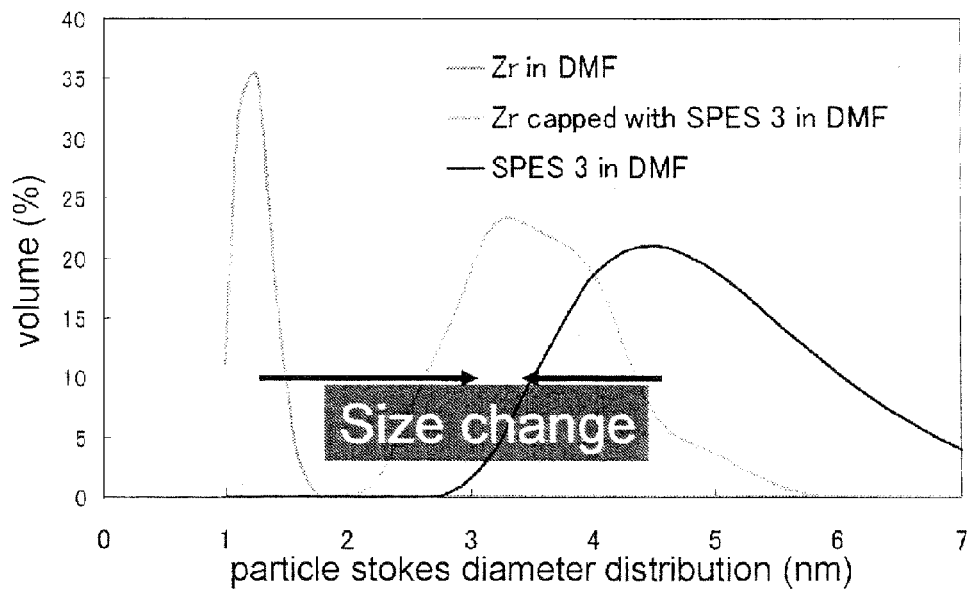
FIG. 18 is a graph showing the Stokes diameter distribution of the hybrid particles determined by dynamic light scattering analysis.
Figure 19:
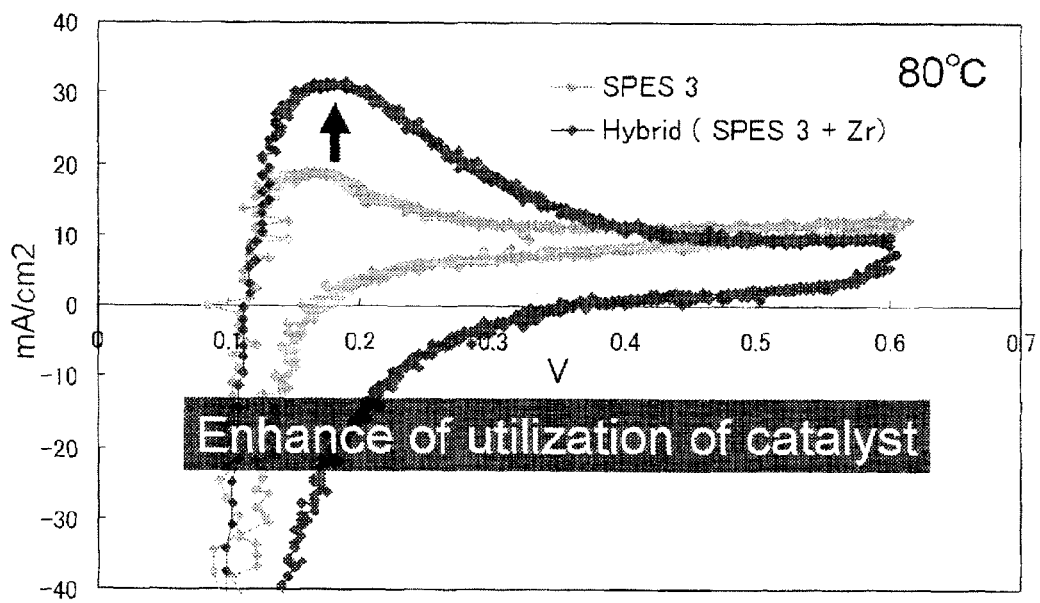
FIG. 19 shows the result of cyclic voltammetry on the hybrid electrode and SPES electrode.
Figure 20:
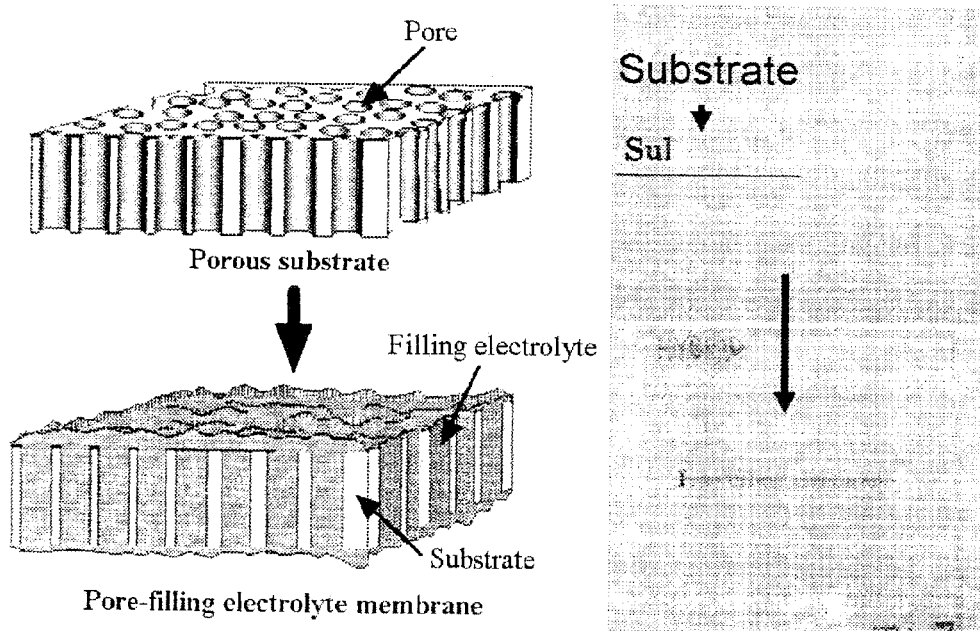
FIG. 20 shows transparency of the substrate before and after filling of the pores with the hybrid.
Figure 21:
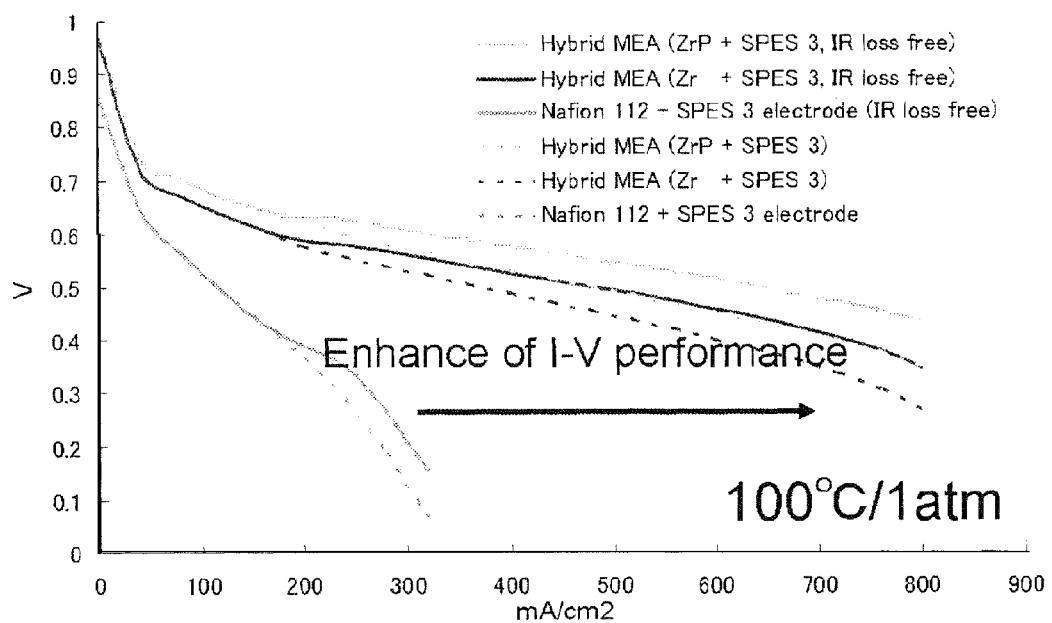
FIG. 21 is a graph showing the IV property of the hybrid MEA (ZrP), hybrid MEA (Zr), and Nafion 112+SPES electrode).

What is claimed is:

1. A proton-conductive hybrid material comprising a proton-conductive inorganic nanoparticle and a proton-conductive polymer, wherein said proton-conductive inorganic nanoparticle is surrounded by said proton-conductive polymer, and wherein a Stokes particle diameter of said proton-conductive hybrid material determined by Dynamic Light Scattering method is 20 nm or less.

2. The material according to claim 1, wherein said proton-conductive inorganic nanoparticle is at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites.

3. The material according to claim 1, wherein said proton-conductive inorganic nanoparticle is zirconium compound, and said zirconium compound is at least one selected from the group consisting of $ZrO_2$, $ZrO_2 \cdot nH_2O$, $Zr(HPO_4)_2$, $Zr(HPO_4)_2 \cdot nH_2O$, $Zr(HSO_3)_2$, $Zr(HSO_3)_2 \cdot nH_2O$, $Zr(O_3P-R^1-SO_3H)_2$, $Zr(O_3P-R^1-SO_3H)_2 \cdot nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x \cdot nH_2O$, wherein $R^1$, $R^2$, and $R^3$ each independently represents a bivalent group.

4. The material according to claim 1, wherein said proton-conductive inorganic nanoparticle is titanium compound, and said titanium compound is at least one selected from the group consisting of $TiO_2$, $TiO_2 \cdot nH_2O$, $Ti(HPO_4)_2$, $Ti(HPO_4)_2 \cdot nH_2O$, $Ti(HSO_3)_2$ and $Ti(HSO_3)_2 \cdot nH_2O$.

5. The material according to claim 1, wherein said proton-conductive inorganic nanoparticle has a Stokes particle diameter, determined by Dynamic Light Scattering method, of 20 nm or less.

6. The material according to claim 1, wherein said proton-conductive inorganic nanoparticle has a proton conductivity of the order of $1 \times 10^{-5}$ S/cm at temperature of 20-150° C.

7. The material according to claim 1, wherein said proton-conductive polymer is one or more of hydrocarbon-based polymers, which can be dissolved in polar organic solvent.

8. The material according to claim 7, wherein said polar organic solvent is selected from the group consisting of N,N-dimethylformamide, dimethyl sulfoxide, 1-methylpyrrolidone and N-methyl acetamide.

9. The material according to claim 1, wherein said proton-conductive polymer is one or more of sulfonated hydrocarbon-based polymers.

10. The material according to claim 1, wherein said proton-conductive polymer is chemically bound to said proton-conductive inorganic nanoparticle.

11. The material according to claim 1, wherein said proton-conductive hybrid material has a proton conductivity of $10^{-3}$ S/cm to 1 S/cm at temperature of −20 to 150° C. under low and high humidity conditions.

12. A dispersion comprising a proton-conductive hybrid material and polar organic solvent,
wherein said proton-conductive hybrid material is evenly dispersed in said polar organic solvent selected from the group consisting of N,N-dimethylformamide, dimethyl sulfoxide, 1-methylpyrrolidone and N-methyl acetamide,
said proton-conductive hybrid material comprises a proton-conductive inorganic nanoparticle and a proton-conductive polymer, wherein said proton-conductive inorganic nanoparticle is surrounded by said proton-conductive polymer, and
a Stokes particle diameter of said proton-conductive hybrid material determined by Dynamic Light Scattering method is 20 nm or less.

13. A method of preparing a dispersion which comprises a proton-conductive hybrid material and polar organic solvent, comprising the steps of:
dissolving a proton-conductive polymer in a first polar organic solvent selected from the group of consisting of N,N-dimethylformamide, dimethyl sulfoxide, 1-methylpyrrolidone and N-methyl acetamide, to obtain a polymer solution;
dispersing a proton-conductive nanoparticle in a second polar organic solvent, which is the same as or different from said first polar organic solvent, selected from the group of consisting of N,N-dimethylformamide, dimethyl sulfoxide, 1-methylpyrrolidone and N-methyl acetamide, to obtain a nanoparticle dispersion; and
pouring said polymer solution into said nanoparticle dispersion or vice versa, to obtain said dispersion which comprises said polar organic solvent and said a proton-conductive hybrid material,
wherein said material comprises said proton-conductive nanoparticle and said proton-conductive polymer, wherein said proton-conductive inorganic nanoparticle is surrounded by said proton-conductive polymer, and a Stokes particle diameter of said proton-conductive hybrid material determined by Dynamic Light Scattering method is 20 nm or less.

14. A method of preparing a proton-conductive hybrid material which comprises a proton-conductive polymer and a proton-conductive inorganic nanoparticle, comprising the steps of:
dissolving a proton-conductive polymer in a first polar organic solvent selected from the group of consisting of N,N-dimethylformamide, dimethyl sulfoxide, 1-methylpyrrolidone and N-methyl acetamide, to obtain a polymer solution;

dispersing a proton-conductive nanoparticle in a second polar organic solvent, which is the same as or different from said first polar organic solvent, selected from the group of consisting of N,N-dimethylformamide, dimethyl sulfoxide, 1-methylpyrrolidone and N-methyl acetamide, to obtain a nanoparticle dispersion;

pouring said polymer solution into said nanoparticle dispersion or vice versa, to obtain said dispersion which comprises said polar organic solvent and said a proton-conductive hybrid material; and removing said first and second polar organic solvent from the resulting dispersion, to obtain said proton-conductive hybrid material, wherein said material comprises said proton-conductive nanoparticle and said proton-conductive polymer, wherein said proton-conductive inorganic nanoparticle is surrounded by said proton-conductive polymer, and a Stokes particle diameter of said proton-conductive hybrid material determined by Dynamic Light Scattering method is 20 nm or less.

15. A catalyst layer used for a fuel cell, comprising a electron-conductor, a catalyst and a proton-conductive hybrid material, wherein said proton-conductive hybrid material comprises a proton-conductive inorganic nanoparticle and proton-conductive polymer, wherein said proton-conductive inorganic nanoparticle is surrounded by said proton-conductive polymer, and a Stokes particle diameter of said proton-conductive hybrid material determined by Dynamic Light Scattering method is 20 nm or less.

16. The catalyst layer according to claim 15, wherein said catalyst layer used for a fuel cell is constructed such that said catalyst is carried at the surface of said electron-conductor, and that said proton-conductive hybrid material is located near the position where said catalyst is located.

17. The catalyst layer according to claim 15, wherein said proton-conductive hybrid material is physically and/or chemically bound to said electron-conductor.

18. The catalyst layer according to claim 15, wherein said electron-conductor is a carbon-based porous electron-conductor or metal-based porous electron-conductor.

19. The catalyst layer according to claim 15, wherein said electron-conductor is a carbon-based porous electron-conductor, and said carbon-based porous electron-conductor is selected from the group consisting of carbon black, acetylene black, graphite, carbon fiber, carbon nanotube, fullerene, activated carbon, and glass carbon.

20. The catalyst layer according to claim 15, wherein said electron-conductor has a particle diameter of 300 nm or less.

21. The catalyst layer according to claim 15, wherein said catalyst is selected from the group of noble metal based catalysts and organic catalysts.

22. The catalyst layer according to claim 15, wherein said catalyst has a particle diameter of 30 nm or less.

23. The catalyst layer according to claim 15, wherein said proton-conductive inorganic nanoparticle is at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites.

24. The catalyst layer according to claim 15, wherein said proton-conductive inorganic nanoparticle is zirconium compound, and said zirconium compound is at least one selected from the group consisting of $ZrO_2$, $ZrO_2 \cdot nH_2O$, $Zr(HPO_4)_2$, $Zr(HPO_4)_2 \cdot nH_2O$, $Zr(HSO_3)_2$, $Zr(HSO_3)_2 \cdot nH_2O$, $Zr(O_3P-R^1-SO_3H)_2$, $Zr(O_3P-R^1-SO_3H)_2 \cdot nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x \cdot nH_2O$, wherein $R^1$, $R^2$, and $R^3$ each independently represents a bivalent group.

25. The catalyst layer according to claim 15, wherein said proton-conductive inorganic nanoparticle is titanium compound, and said titanium compound may be at least one selected from the group consisting of $TiO_2$, $TiO_2 \cdot nH_2O$, $Ti(HPO_4)_2$, $Ti(HPO_4)_2 \cdot nH_2O$, $Ti(HSO_3)_2$ and $Ti(HSO_3)_2 \cdot nH_2O$.

26. The catalyst layer according to claim 15, wherein said proton-conductive inorganic nanoparticle has a Stokes particle diameter, determined by Dynamic Light Scattering method, of 20 nm or less.

27. The catalyst layer according to claim 15, wherein said proton-conductive inorganic nanoparticle has a proton conductivity of the order of $1 \times 10^{-5}$ S/cm at temperature of 20-150° C.

28. The catalyst layer according to claim 15, wherein said proton-conductive polymer is one or more of hydrocarbon-based polymers which can be dissolved in polar organic solvent.

29. The catalyst layer according to claim 28, wherein said polar organic solvent is selected from the group consisting of N,N-dimethylformamide, dimethyl sulfoxide, 1-methylpyrrolidone and N-acetamide.

30. The catalyst layer according to claim 15, wherein said proton-conductive polymer is one or more of sulfonated hydrocarbon-based polymers.

31. The catalyst layer according to claim 15, wherein said proton-conductive polymer is chemically bound to said proton-conductive inorganic nanoparticle.

32. A method of preparing a catalyst layer used for a fuel cell, which comprises a electron-conductor, a catalyst and a proton-conductive hybrid material, comprising the steps of:

a) carrying said catalyst with said electron-conductor;

b) preparing a proton-conductive hybrid material dispersion in which said proton-conductive hybrid material is dispersed in a polar organic solvent;

c) mixing said dispersion with said electron-conductor carried with said catalyst, to obtain a mixture; and d) applying said mixture to a diffusion layer used for a fuel cell, to obtain said catalyst layer used for a fuel cell;

wherein said proton-conductive hybrid material comprises a proton-conductive inorganic nanoparticle and proton-conductive polymer, wherein said proton-conductive inorganic nanoparticle is surrounded by said proton-conductive polymer, and a Stokes particle diameter of said proton-conductive hybrid material determined by Dynamic Light Scattering method is 20 nm or less.

33. An electrolyte membrane used for a fuel cell, comprising a proton-conductive hybrid material, wherein said proton-conductive hybrid material comprises a proton-conductive nanoparticle and proton-conductive polymer, wherein said proton-conductive inorganic nanoparticle is surrounded by said proton-conductive polymer, and a Stokes particle diameter of said proton-conductive hybrid material determined by Dynamic Light Scattering method is 20 nm or less.

34. The electrolyte membrane according to claim 33, wherein said electrolyte membrane has a substrate, and said proton-conductive hybrid material is chemically and/or physically bound to said substrate.

35. The electrolyte membrane according to claim 34, wherein said substrate is selected from the group consisting of porous polymers and porous ceramics.

36. The electrolyte membrane according to claim 33, wherein said proton-conductive inorganic nanoparticle is at least one selected from the group consisting of zirconium compounds, titanium compounds, cerium compounds, uranium compounds, tin compounds, vanadium compounds, antimony compounds, and calcium hydroxyapatite and hydrated calcium hydroxyapatites.

37. The electrolyte membrane according to claim 33, wherein said proton-conductive inorganic nanoparticle is zirconium compound, and said zirconium compound is at least one selected from the group consisting of $ZrO_2$, $ZrO_2 \cdot nH_2O$, $Zr(HPO_4)_2$, $Zr(HPO_4)_2 \cdot nH_2O$, $Zr(HSO_3)_2$, $Zr(HSO_3)_2 \cdot nH_2O$, $Zr(O_3P-R^1-SO_3H)_2$, $Zr(O_3P-R^1-SO_3H)_2 \cdot nH_2O$, $Zr(O_3P-R^2-SO_3H)_{2-x}(O_3P-R^3-COOH)_x$, and $Zr(O_3P-R^2-SO_3H)_{2-x}(O_3P-R^3-COOH)_x \cdot nH_2O$, wherein $R^1$, $R^2$, and $R^3$ each independently represents a bivalent group.

38. The electrolyte membrane according to claim 33, wherein said proton-conductive inorganic nanoparticle is titanium compound, and said titanium compound is at least one selected from the group consisting of $TiO_2$, $TiO_2 \cdot nH_2O$, $Ti(HPO_4)_2$, $Ti(HPO_4)_2 \cdot nH_2O$, $Ti(HSO_3)_2$ and $Ti(HSO_3)_2 \cdot nH_2O$.

39. The electrolyte membrane according to claim 33, wherein said proton-conductive inorganic nanoparticle has a Stokes particle diameter, determined by Dynamic Light Scattering method, of 20 nm or less.

40. The electrolyte membrane according to claim 33, wherein said proton-conductive inorganic nanoparticle has a proton conductivity of the order of $1 \times 10^{-5}$ S/cm at temperature of 20-150° C.

41. The electrolyte membrane according to claim 33, wherein said proton-conductive polymer is one or more of hydrocarbon-based polymers which can be dissolved in polar organic solvent.

42. The electrolyte membrane according to claim 41, wherein said polar organic solvent is selected from the group consisting of N,N-dimethylformamide, dimethyl sulfoxide, 1-methylpyrrolidone and N-acetamide.

43. The electrolyte membrane according to claim 33, wherein said proton-conductive polymer is one or more of sulfonated hydrocarbon-based polymers.

44. The electrolyte membrane according to claim 33, wherein said proton-conductive polymer is chemically bound to said proton-conductive inorganic nanoparticle.

45. The electrolyte membrane according to claim 33, wherein said electrolyte membrane used for a fuel cell has a proton conductivity of $10^{-2}$ S/cm to 5 S/cm at temperature of −20 to 150° C. under low and high humidity conditions.

46. A method of preparing an electrolyte membrane used for a fuel cell, which comprises a porous substrate and a proton-conductive hybrid material, comprising the steps of:
   x) preparing a proton-conductive hybrid material dispersion in which said proton-conductive hybrid material is dispersed in a polar organic solvent; and
   y) applying said dispersion to pores of said electrolyte membrane or pores and surface of said electrolyte membrane, to obtain said electrolyte membrane used for a fuel cell;
   wherein said proton-conductive hybrid material comprises a proton-conductive inorganic nanoparticle and proton-conductive polymer, wherein said proton-conductive inorganic nanoparticle is surrounded by said proton-conductive polymer, and a Stokes particle diameter of said proton-conductive hybrid material determined by Dynamic Light Scattering method is 20 nm or less.

* * * * *